US011544251B1

(12) United States Patent
Lindaaker et al.

(10) Patent No.: US 11,544,251 B1
(45) Date of Patent: Jan. 3, 2023

(54) DATABASE SYSTEM WITH TRANSACTIONAL COMMIT PROTOCOL BASED ON SAFE CONJUNCTION OF MAJORITIES

(71) Applicant: Neo4j Sweden AB, San Mateo, CA (US)

(72) Inventors: Mats Tobias Lindaaker, Malmö (SE); James Webber, Guildford (GB)

(73) Assignee: Neo4j Sweden AB, San Mateo, CA (US)

( * ) Notice: Subject to any disclaimer, the term of this patent is extended or adjusted under 35 U.S.C. 154(b) by 225 days.

(21) Appl. No.: 16/860,570

(22) Filed: Apr. 28, 2020

(51) Int. Cl.
*G06F 16/23* (2019.01)
*G06F 16/27* (2019.01)
*G06F 16/901* (2019.01)

(52) U.S. Cl.
CPC .......... *G06F 16/2379* (2019.01); *G06F 16/27* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 9,971,822 | B1* | 5/2018 | Deardeuff | G06F 9/466 |
| 10,452,680 | B1* | 10/2019 | Fan | G06F 16/27 |
| 2012/0324472 | A1* | 12/2012 | Rossbach | G06F 9/467 |
| | | | | 718/106 |
| 2015/0269215 | A1* | 9/2015 | Lehouillier | G06F 16/27 |
| | | | | 707/626 |
| 2017/0185643 | A1* | 6/2017 | Doshi | G06F 16/2379 |
| 2018/0176300 | A1* | 6/2018 | Chen | H04L 67/1095 |
| 2021/0240517 | A1* | 8/2021 | Mohapatra | G06F 9/466 |

* cited by examiner

*Primary Examiner* — Richard L Bowen
(74) *Attorney, Agent, or Firm* — Van Pelt, Yi & James LLP

(57) ABSTRACT

A database system with a transactional commit protocol based on a safe conjunction of majorities is disclosed. In various embodiments, a directed acyclic graph comprising, for each of a plurality of database transactions, data identifying the transaction, data indicating one or more prior database transactions on which the database transaction depends, and data indicating whether the transaction has been committed is stored. A leading edge comprising a set of committed leaf nodes of the directed acyclic graph is determined. Data representing the leading edge is provided to a transaction coordinator configured to use the leading edge to determine based at least in part on the leading edge to commit a transaction.

13 Claims, 21 Drawing Sheets

DATABASE SYSTEM WITH TRANSACTIONAL COMMIT PROTOCOL BASED ON SAFE CONJUNCTION OF MAJORITIES

BACKGROUND OF THE INVENTION

A graph database is a computerized record management system that uses a network structure with nodes, relationships, labels, and properties to represent data. A node may represent an entity such as a person, a business, an organization, or an account. Each node has zero or more labels that declare its role(s) in the network, for example as a customer or a product. Nodes have zero or more properties which contain user data. For example, if a node represents a person, the properties associated with that node may be the person's first name, last name, and age. Relationships connect nodes to create high fidelity data models. Relationships are directed, have a type which indicates their purpose and may also have associated property data (such as weightings).

Graph databases have various applications. For example, a graph database may be used in healthcare management, retail recommendations, transport, power grids, integrated circuit design, fraud prevention, and a social network system, to name a few.

The graph model is popular. However, the field of graph database management systems is in its infancy. Popular graph database management systems which provide safety and strong consistency for data in a replicated system exist but typically use algorithms which constrain scalability.

There are also popular graph database management systems which distribute data across collaborating servers. They aim to improve the throughput of the graph database management system by partitioning graph data across multiple cooperating servers to process work (queries and updates) concurrently.

However, there are known are flaws in update algorithms for contemporary distributed graph databases such that they place the consistency of data at risk, even in the absence of faults. Specifically, relationships that span servers are susceptible to corruption. Moreover, it is known that the rate of corruption, while low, compounds over time as corrupt data is used as the basis for future updates, which spreads through the structure of the graph.

BRIEF DESCRIPTION OF THE DRAWINGS

Various embodiments of the invention are disclosed in the following detailed description and the accompanying drawings.

DETAILED DESCRIPTION

Figure 1:
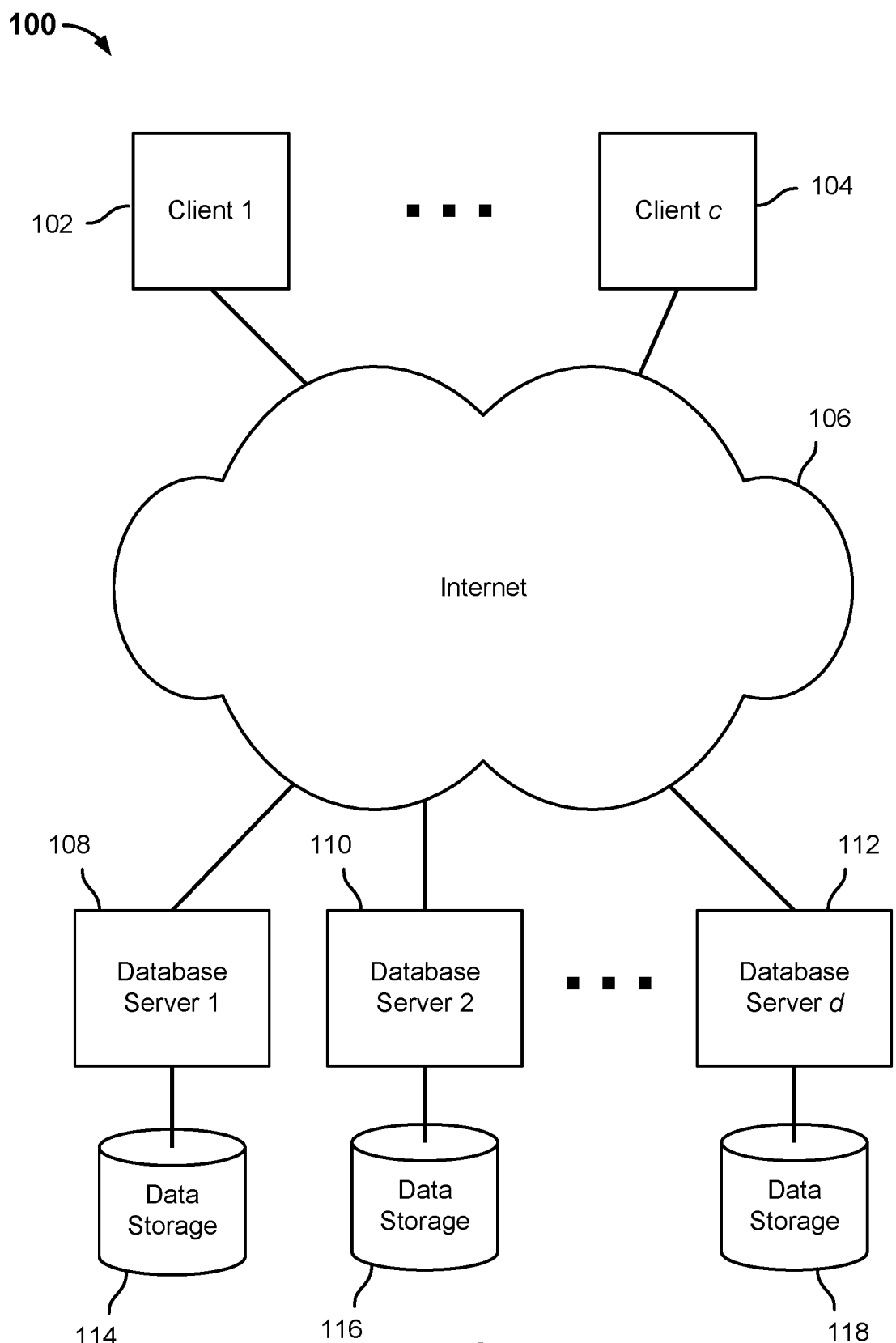
FIG. 1 is a block diagram illustrating an embodiment of a database system with transactional commit protocol based on safe conjunction of majorities.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following description, numerous specific details are set forth in order to provide a thorough understanding of the techniques disclosed herein. It will be apparent, however, to one skilled in the art, that the techniques disclosed herein may be practiced without some or all of these specific details. In the interest of clarity, detailed descriptions of some well-known processes and/or structures will be omitted.

In some embodiments, techniques disclosed herein are described in the context of graph databases which present obvious and difficult challenges for consistency. However, it should be apparent to those skilled in the art that the techniques are applicable to other kinds of database.

In some cases, in this document for clarity and brevity node information such as "a node with a property with key "name" with value Alice" may sometimes be shortened to "a node with value Alice."

Techniques are disclosed to ensure the safety and strong consistency of data, including across replicated and/or distributed database systems. In various embodiments, a transactional commit protocol based on safe conjunction of majorities is described and implemented. In various embodiments, each database system (e.g., server) and/or instance maintains a newly disclosed data structure to track transactions and their status. In various embodiments, the data structure comprises a directed acyclic graph (DAG), sometimes referred to herein as a "transaction directed acyclic graph" or "TxDAG".

In various embodiments, techniques disclosed herein are used to ensure the safe storage of data in replicated or distributed database management systems with a consistency model that is both strong and scalable. A general-purpose distributed algorithm which useful for single servers, replicated databases, and distributed databases is disclosed. It is useful in the case of distributed graph databases since its model guarantees reciprocal consistency—a difficult requirement unique to that class of database management systems. Techniques described herein in the context of graph databases are applied in various embodiments to other databases.

In various embodiments, the dilemma of safety with low scalability versus unsafe but scalable deployment for a graph database management system is addressed. An algorithm which can be used in replicated or distributed database management systems and which upholds the traditional ACID properties with sequential consistency—a strong consistency model whose implementations are fraught with performance difficulties—is disclosed.

In various embodiments, ACID semantics are upheld with a strong consistency guarantee while permitting concurrent updates at multiple servers with scalable coordination. The disclosed approach allows distributed graph databases to store data safely (with necessary reciprocal consistency for storing relationships that span cooperating servers). In various embodiments, no centralized agents are required and a system as disclosed is architecturally scalable.

FIG. 1 is a block diagram illustrating an embodiment of a database system with transactional commit protocol based on safe conjunction of majorities. In the example shown, the data access system and environment 100 includes a plurality of client systems/devices, represented in FIG. 1 by clients 102 and 104, connected via the Internet 106 to a set of database servers, represented in FIG. 1 by database servers 108, 110, and 112, each of which having an associated data storage device/system 114, 116, and 118, respectively.

In various embodiments, each of the database servers is configured to maintain and use transaction directed acyclic graph (TxDAG), as described more fully below, to track and determine whether the server is prepared to commit a given transaction. A directed acyclic graph, such as a TxDAG as disclosed herein, is a directed graph data structure that uses a topological ordering. The sequence can only go from earlier to later.

In various embodiments, techniques disclosed herein are used in database systems comprising one or more database servers. In some embodiments, a database may be replicated across a plurality of database servers, e.g., for redundancy, and techniques disclosed herein are implemented by each database server. In some embodiments, a database may be distributed across a plurality of database servers, and each distributed "shard" may be replicated across multiple servers, and techniques disclosed herein are implemented by each database server. For example, in various embodiments, techniques disclosed herein are employed among the services across which each shard is replicated. Within each shard, a transaction is determined to be prepared to be committed if a majority of servers within that shard agree under the protocol described herein, and across (participating) shards the transaction is committed if a majority in all participating shards voted to commit, sometimes referred to herein as a "conjunction of majorities".

Figure 2A:
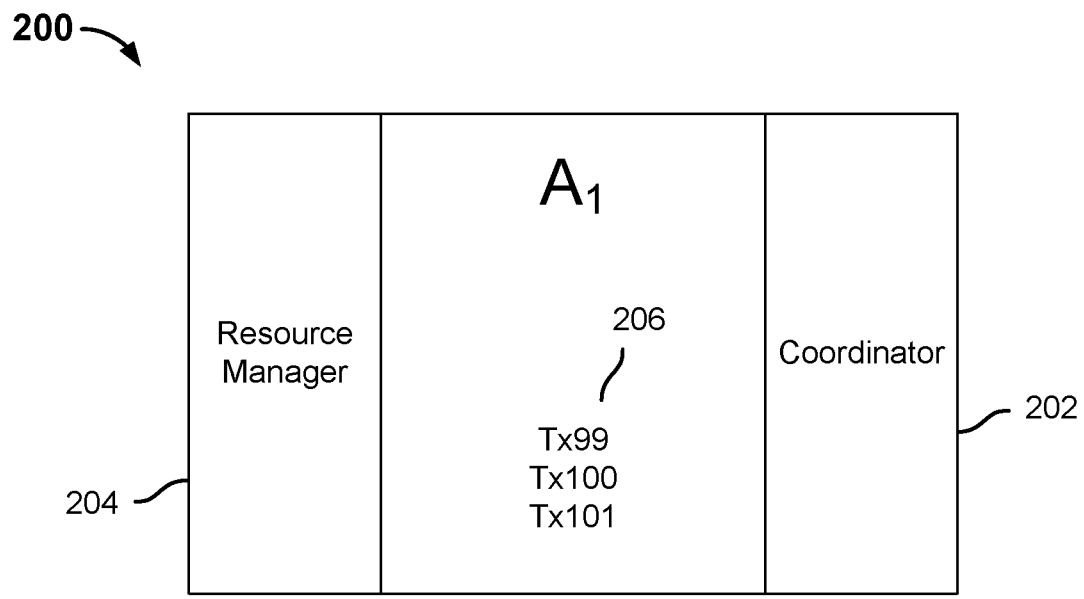
FIG. 2A is a diagram illustrating an embodiment of a database server configured to participate in a transactional commit protocol based on safe conjunction of majorities.

FIG. 2A is a diagram illustrating an embodiment of a database server configured to participate in a transactional commit protocol based on safe conjunction of majorities. In some embodiments, techniques disclosed herein are implemented by a single database management system server, such as database management system server 200 of FIG. 2A.

In the example shown, a single server, such as database management system server 200, includes three major components: a database ($A_1$), a Resource Manager (204), and a Coordinator (202).

a. The database $A_1$ stores data and enables stored data to be queried. It has an identifier ($A_1$ in this case) and keeps track of the last transactions (updates) it has processed in a structure (TxDAG 206), which supports safe, concurrent processing of transactions.

b. The Coordinator 202 executes the instructions required to safely commit transactions on behalf of a client such that the client's updates can be applied to the database or cleanly rolled back with no intermediate states visible.

c. The Resource Manager 204 determines whether a transaction can be safely processed given the current state of the system.

For the purposes of transaction processing as disclosed herein, a single server, such as database management system server 200, is a special case of multi-server: in either case, in various embodiments, a majority of servers must agree to commit the transaction for it to be processed. In a single-server case, the majority is by definition a single server.

Figure 2B:
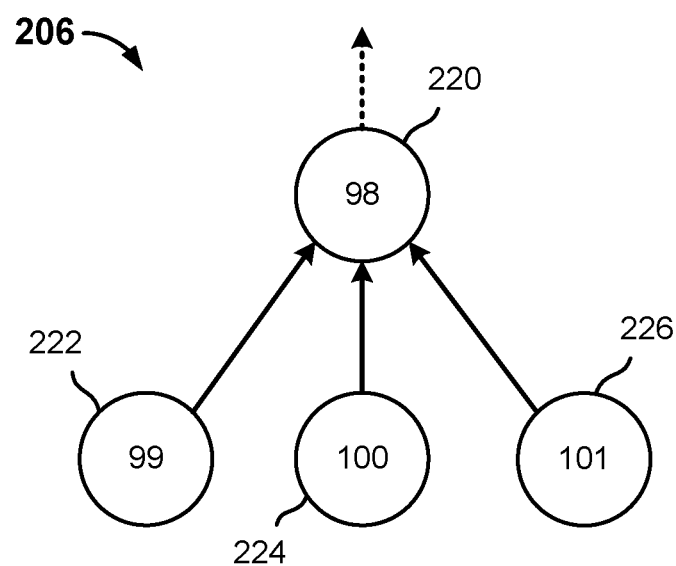
FIG. 2B is a diagram illustrating an example of a portion of a transaction directed acyclic graph (TxDAG) in an embodiment of a database system with transactional commit protocol based on safe conjunction of majorities.

FIG. 2B is a diagram illustrating an example of a portion of a transaction directed acyclic graph (TxDAG) in an embodiment of a database system with transactional commit protocol based on safe conjunction of majorities. In the example shown, the portion of TxDAG 206 represented in FIG. 2B is shown to include a "leading edge" comprising committed transactions 99, 100, and 101, (sometimes denoted "Tx99", etc.), represented in FIG. 2B by TxDAG nodes 222, 224, and 226, respectively, all of which depend from a prior committed transaction 98 (node 220). In various embodiments, the "leading edge" of a TxDAG as disclosed herein comprises all committed leaf nodes are part of the leading edge and are the base for future transactions.

FIGS. 3A through 3E illustrate an example of transaction processing according to techniques and using data structures, such as the TxDAG, as disclosed herein.

Figure 3A:
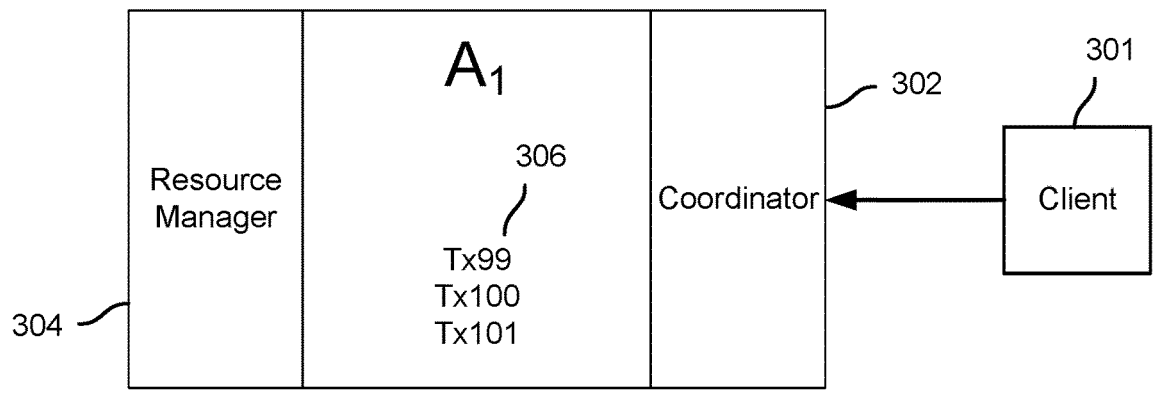
FIGS. 3A through 3E illustrate an example of transaction processing according to techniques and using data structures, such as the TxDAG, as disclosed herein.

As shown in FIG. 3A, processing begins when a client 301 sends an update to the Coordinator 302.

Figure 3B:
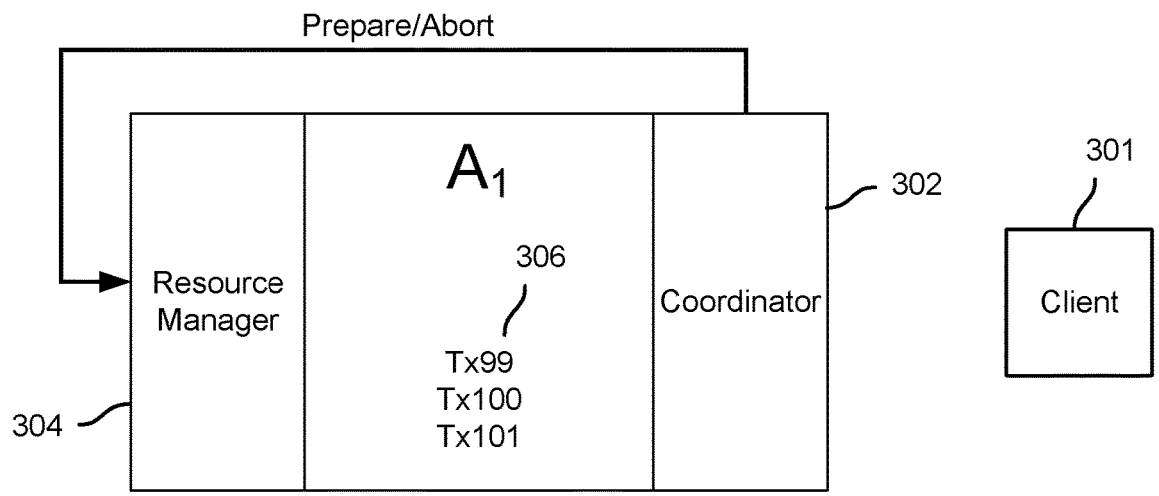

The Coordinator 302 creates a transaction on behalf of the client. The Coordinator sends the update (a write-query) to the Resource Manager 304 with a "prepare" message, as shown in FIG. 3B.

Figure 3C:
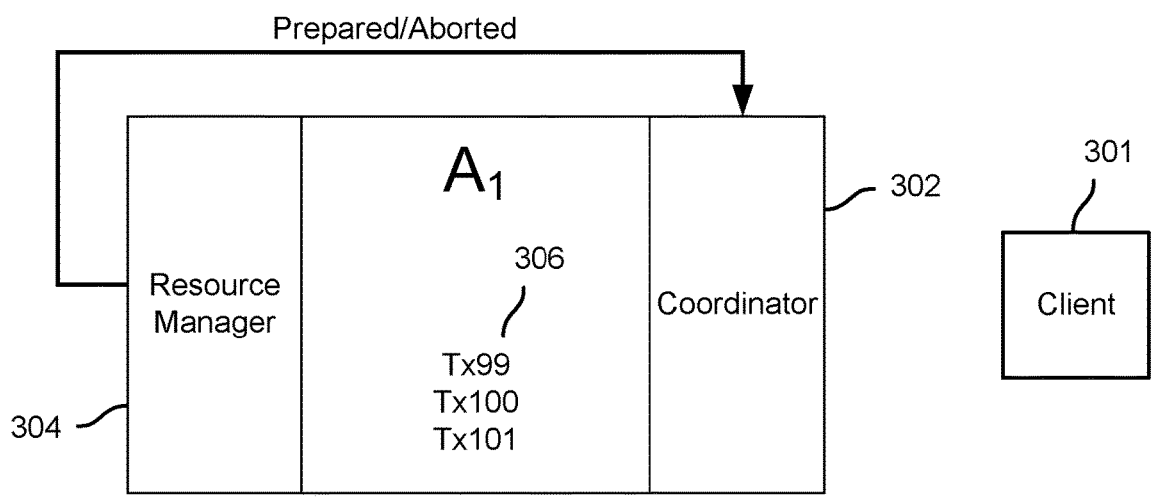

The Resource Manager 304 verifies that the work can be completed satisfactorily such that the transaction can be committed with respect to the state of the database and other concurrent transactions. If so, the Resource Manager 304 responds with a "prepared" message to the Coordinator 302, as shown in FIG. 3C. Conversely, if the transaction is not able to be applied the Resource Manger 304 responds with an aborted message to the Coordinator 302.

Figure 3D:
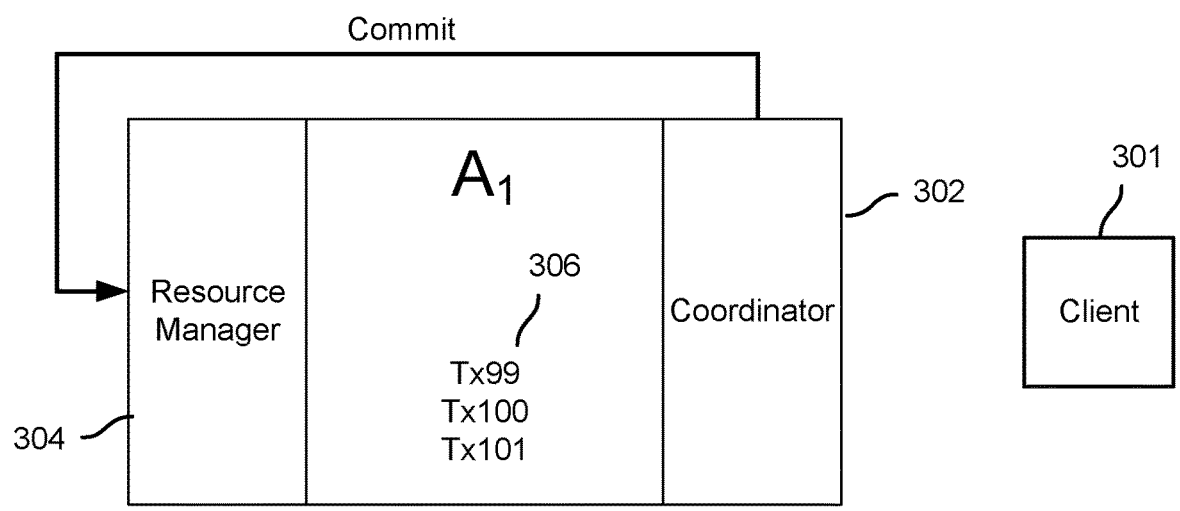
Figure 3E:
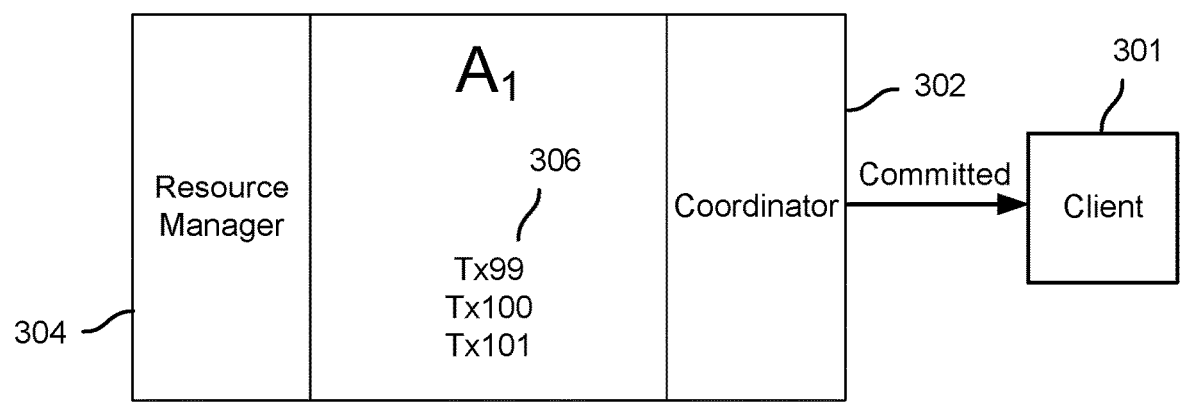

If the Coordinator 302 receives a "prepared" message, it instructs the Resource Manager 304 to "commit", as shown in FIG. 3D. It can concurrently inform the client 301 of the successful outcome, as shown in FIG. 3E.

If the Coordinator 302 receives an "aborted" message, no further work is necessary other than to inform the client. The Coordinator informs the client of the unsuccessful outcome.

Up to this point, the described approach is similar to classic two-phase commit (2PC). Unlike 2PC however, in various embodiments a system as disclosed herein embodies a protocol that allows safe concurrent transactional commits from multiple servers concurrently. In various embodiments, the safety property is upheld by the algorithm and data structure encoded within the Resource Manager.

In various embodiments, the Resource Manager maintains three discrete buckets of state.
  a. Historical transaction state as applied to the database;
  b. The identifiers of the most recent transaction or transactions to be committed;
  c. The currently active transactions.

The Resource Manager's task is to reason about those buckets of state within the context of constraints from the data model and other concurrent activity, to determine whether the current transaction can safely commit. In various embodiments, the Resource Manager is allowed to commit transactions concurrently for performance reasons. Committing a single transaction is a special case where there is exactly one thread of control active at any time. To allow safe, concurrent commits, in various embodiments, a system as disclosed herein structures knowledge about committed transactions into a directed, acyclic graph (TxDAG), as in the examples described above and below.

In various embodiments, a TxDAG as disclosed herein is akin to a traditional transaction log, but instead of having a single (usually contended) head element into which transactions are appended, the TxDAG has a leading edge against which concurrent transactions can be based. Forks and joins in the structure of the TxDAG mirror the level of concurrent commits and aborts in the database over its history. In various embodiments, the TxDAG is the ultimate arbiter of whether a transaction can safely commit for any given server, even in the single server case.

FIGS. 4A through 4H illustrate an example of transaction processing according to techniques and using data structures, such as the TxDAG, as disclosed herein.

Figure 4A:
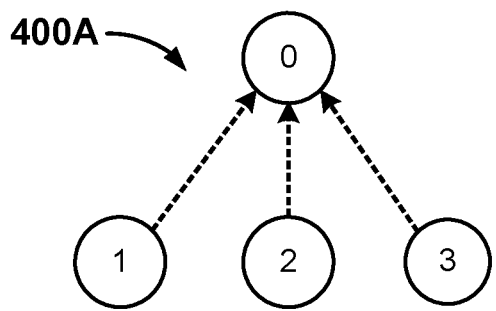
FIGS. 4A through 4H illustrate an example of transaction processing according to techniques and using data structures, such as the TxDAG, as disclosed herein.

Referring to FIG. 4A, starting with an empty database, concurrent transactions are applied then to the server with the intent store some data. In the TxDAG 400A in FIG. 4A, node 0 represents the empty database and nodes 1, 2, 3 each represent sets of concurrent updates (transactions) to the database. We say that transactions 1, 2, and 3 are based on transaction 0 (the empty database). The dashed-line arrows indicate the transactions 1, 2, and 3 are not committed.

The inbound transactions in FIG. 4A are all concurrent from the point of view of the Resource Manager. That transactions 1, 2, and 3 are concurrent is easy to reason about: they have no interdependencies in the TxDAG 400A save the common ancestor node 0 which is said to have happened (i.e., been committed) "before" updates 1, 2, and 3.

Accordingly, when the Resource Manager for the server is asked whether it will prepare for each transaction, 1, 2, and 3, in this example, it responds "prepared" and gives the leading edge of the TxDAG consisting of a leading edge of solely {0} as its base.

Figure 4B:
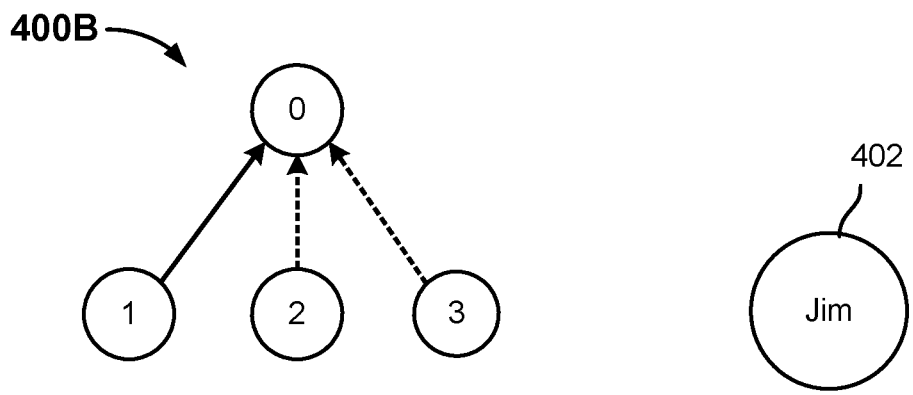

In FIG. 4B, the transaction represented by node 1 in the TxDAG 400B has subsequently committed (represented by the solid line/arrow to "0", versus dashed) and as a side-effect has created a new node 402 in the graph database with the value "Jim". The leading edge of the TxDAG is now a set with a single member represented as {1}, the only committed transaction.

Figure 4C:
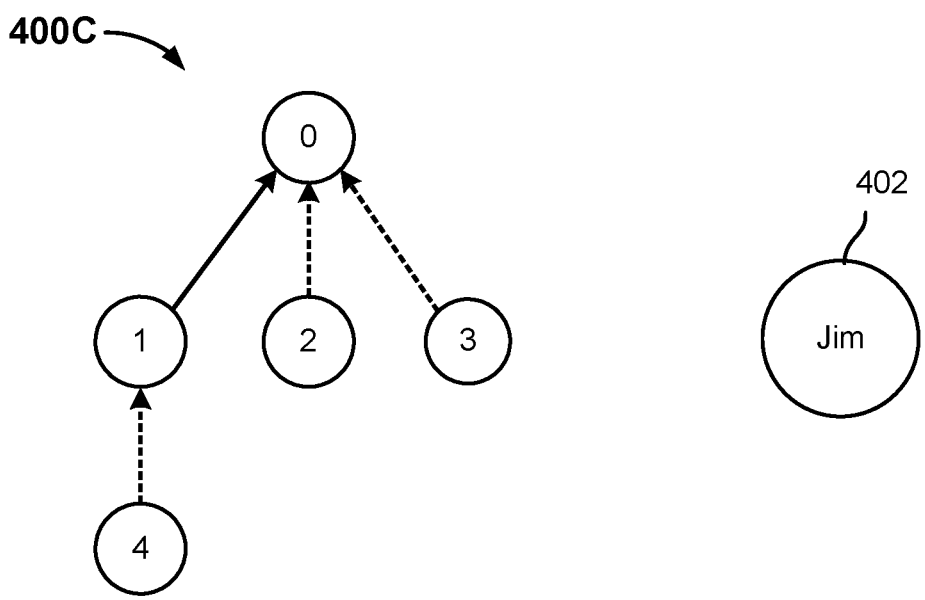

In FIG. 4C, a new transaction represented by node 4 in the TxDAG 400C has begun based on the leading edge of the TxDAG (all the committed leaf nodes) which contains only transaction 1 at this point. Node 4 is preparing alongside the existing transactions represented by nodes 2 and 3 based on their earlier TxDAG leading edge (the empty database, or {0}). No further updates to the database have been made. The leading edge of the TxDAG 400C remains a set with a single member represented as {1}, on which any future transactions will be based.

Figure 4D:
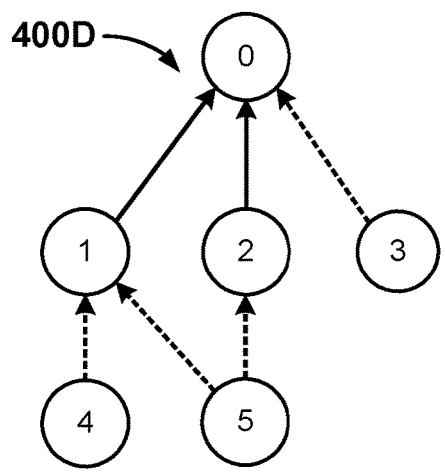
Figure 4D:
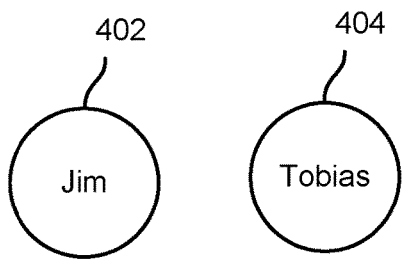

In FIG. 4D, the transaction represented by node 2 in the TxDAG 400D has committed, causing an update to be made to the database: a node 404 with value "Tobias" has been created as a side-effect. The leading edge of the TxDAG 400D is now {1, 2}—all committed leaf nodes—on which all future transactions will be based.

Also in FIG. 4D, the transaction represented by node 5 in the TxDAG 400D attempts to prepare but contends with the activity in the transaction represented by node 4 (e.g. it tries to obtain the same exclusive locks). The transaction cannot safely commit else it would cause inconsistency in the database. The leading edge of the TxDAG 400D remains {1, 2} on which any future transactions will be based.

In various embodiments, precisely how unsafe concurrent commits are identified is a design choice to be made by a database management system implementer. For example, in some embodiments a model of shared read and exclusive write locks for database objects is assumed. In other embodiments, more sophisticated approaches are used.

Figure 4E:
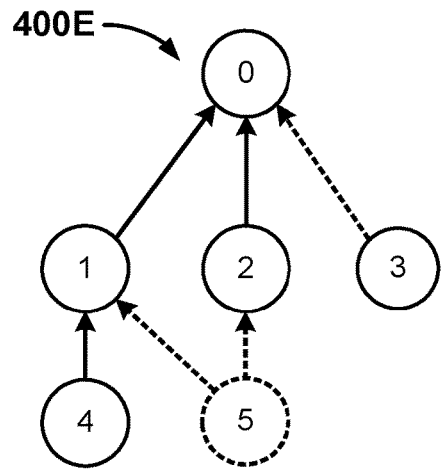
Figure 4E:
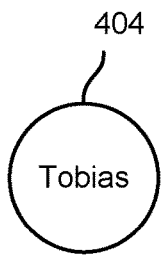

In FIG. 4E, the transaction represented by node 4 in the TxDAG 400E commits to the database causing the deletion of the node 402 with the value "Jim". Concurrently the transaction represented by node 5 in the TxDAG 400E aborts, as represented by the dashed line circle for node 5. The leading edge of the TxDAG 400E is now {4, 2}.

Figure 4F:
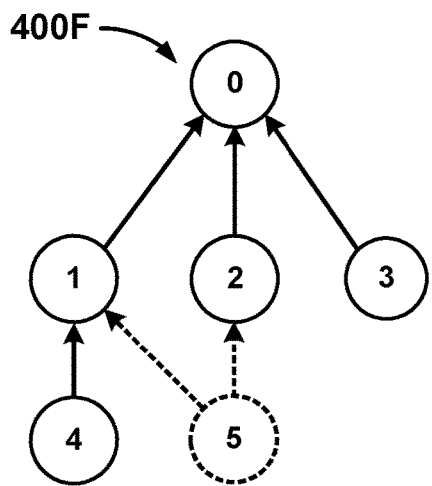
Figure 4F:
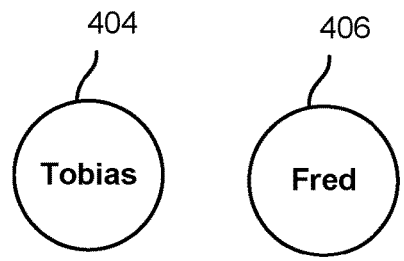

In FIG. 4F, the transaction represented by node 3 in the TxDAG 400F (finally) commits to the database causing the creation of the disconnected node 406 with the value "Fred". The leading edge of the TxDAG 400F is now {4, 2, 3} and the database contains two nodes 404, 406, with values "Tobias" and "Fred", respectively.

Figure 4G:
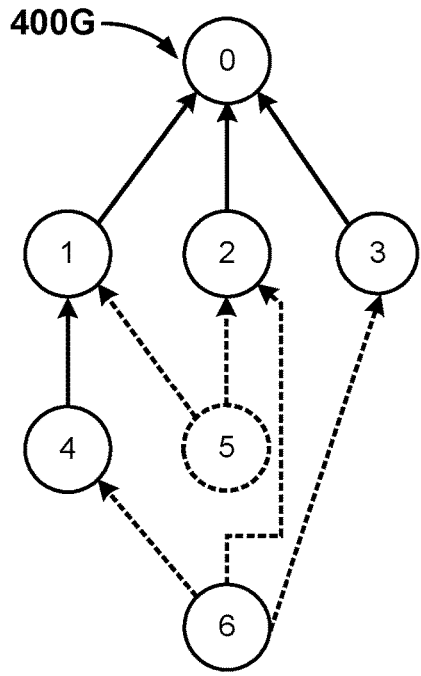
Figure 4G:
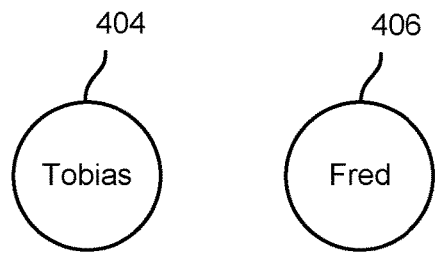

In FIG. 4G, the transaction represented by node 6 in the TxDAG 400G prepares based on the leading edge of the TxDAG 400G {4, 2, 3}.

Figure 4H:
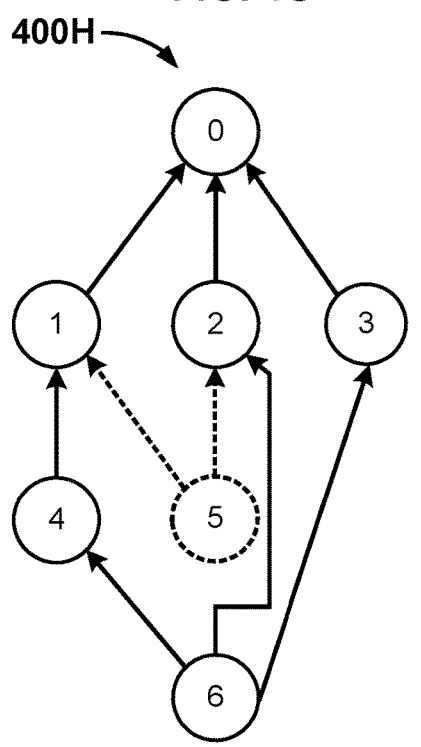
Figure 4H:
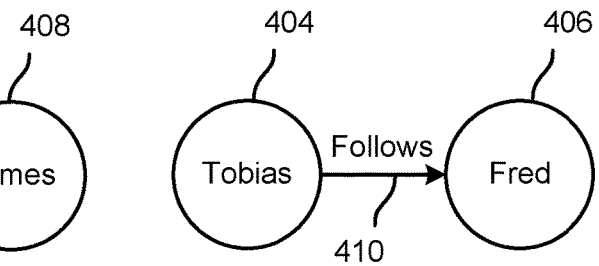

In FIG. 4H, the transaction represented by node 6 in the TxDAG 400H commits based on the previous leading edge of the TxDAG 400G {4, 2, 3}. There are no other concurrent transactions at this time and so the leading edge of TxDAG 400G narrows to just {6}. As a side-effect of processing the transactions, the graph stored in the database is updated such that a new node 408 having value "James" is created, and a new relationship 410 FOLLOWS is created from the "Tobias" node 404 to the "Fred" node 406, demonstrating the multi-object nature of transactions in various embodiments.

The processing of transactions continues in this way until the server is stopped. At various points in time the TxDAG (400A through 400G) may be wider or narrower depending on the concurrent (or not) workload whose processing it supports.

A single server is neither scalable (modern workloads can overwhelm a single computer) nor is it fault-tolerant (losing the server makes the database unavailable). In various embodiments, more scalable and fault-tolerant systems are composed by aggregating single servers. In various embodiments, each server in a system comprising multiple servers is configured to maintain a safe, consistent history of their TxDAG as disclosed herein, to maintain data consistency inside the database.

After a single server, the next step up in terms of scale and fault-tolerance is a replicated database. A replicated database runs on multiple servers, and a (near) full copy of the database resides on each server. The reason each server hosts a near full copy of the database is that while working some servers are always slightly ahead or behind others which is normal in distributed systems.

FIGS. 5A through 5D illustrate an example of transaction processing in a replicated database, according to techniques and using data structures, such as the TxDAG, as disclosed herein.

Figure 5A:
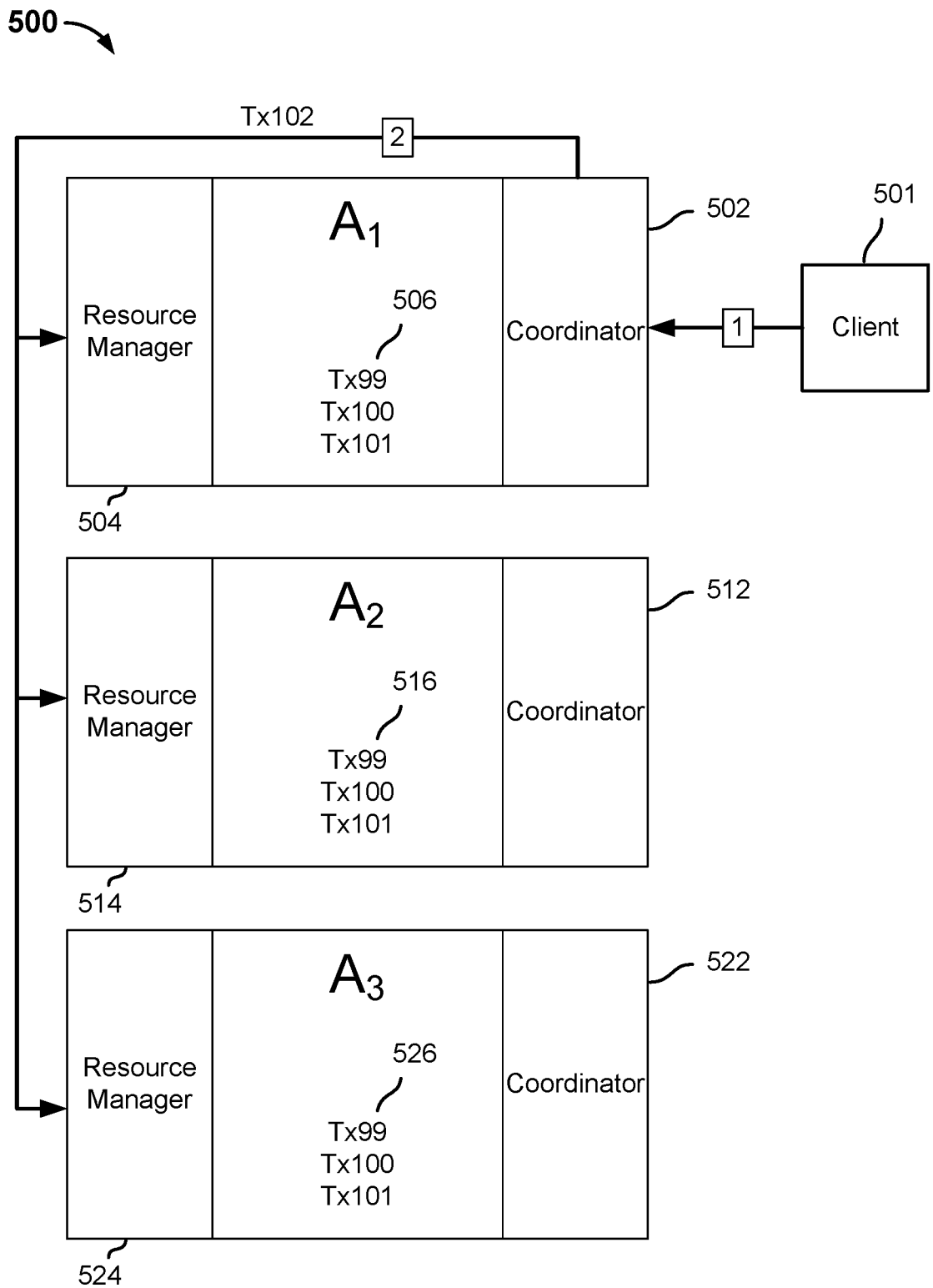
FIGS. 5A through 5D illustrate an example of transaction processing in a replicated database, according to techniques and using data structures, such as the TxDAG, as disclosed herein.

A replicated database system 500 is shown in FIG. 5A. In this example, the replicated database is constructed by aggregating three single servers each of which maintains their own independent TxDAG (506, 516, 526) and associated database ($A_1$, $A_2$, $A_3$). Each server hosts a Resource Manager (504, 514, 524) for making local decisions about transactions with respect to the local TxDAG and database. Each server also hosts a transaction Coordinator (502, 512, 522), which manages the commit process across all the servers when a database client, such as client 501, wants to store data.

Server discovery, routing of messages from a client to servers and between servers are implemented using known techniques, in various embodiments. In various embodiments, existing techniques are used to form an initial cluster, using best-effort algorithms, and routing is similarly best-effort.

Once a system is bootstrapped, in various embodiments, the same commit protocol used to store user data in the database is used to store the system topology as servers are added and removed, fail and recover. This provides a strongly consistent guarantee for server topologies for a live cluster. Clients query the cluster topology just like any other data which enables them to bind to a live Coordinator (assuming the cluster is sufficiently available).

To return to transaction processing, in FIG. 5A, the leading edge of the TxDAG (506, 516, 526) on each server is {99, 100, 101}, a reasonable state for fault-free system. This is obvious because the leading edge of the TxDAG is identical on each server.

In various embodiments, safety is ensured by only allowing an update if a majority of servers agree to the same TxDAG leading edge as a precondition, as well as demanding those servers agree that no constraint violations would occur as a result of processing the transaction. State another way, succinctly, in various embodiments, a majority of servers must agree on a consistent starting state and ending state for each transaction.

In the example shown in FIG. 5A, client 501 issues a single uncontended transaction labelled "1". The transaction in this example is received by Coordinator 502 on the server A1, although in various embodiments any available Coordinator is able to process any incoming transaction. Subsequently the Coordinator 502 at A1 begins the commit process by sending "prepare" messages to the other servers in the database, labelled "2" (i.e., "Tx102").

The "prepare" messages from FIG. 5A are evaluated by each of the Resource Managers (504, 514, 524) against its own local TxDAG (506, 516, 526, respectively). The updates are checked for any constraint violations based on other concurrently executing transactions (there are none in this example) and the current state of the database.

Figure 5B:
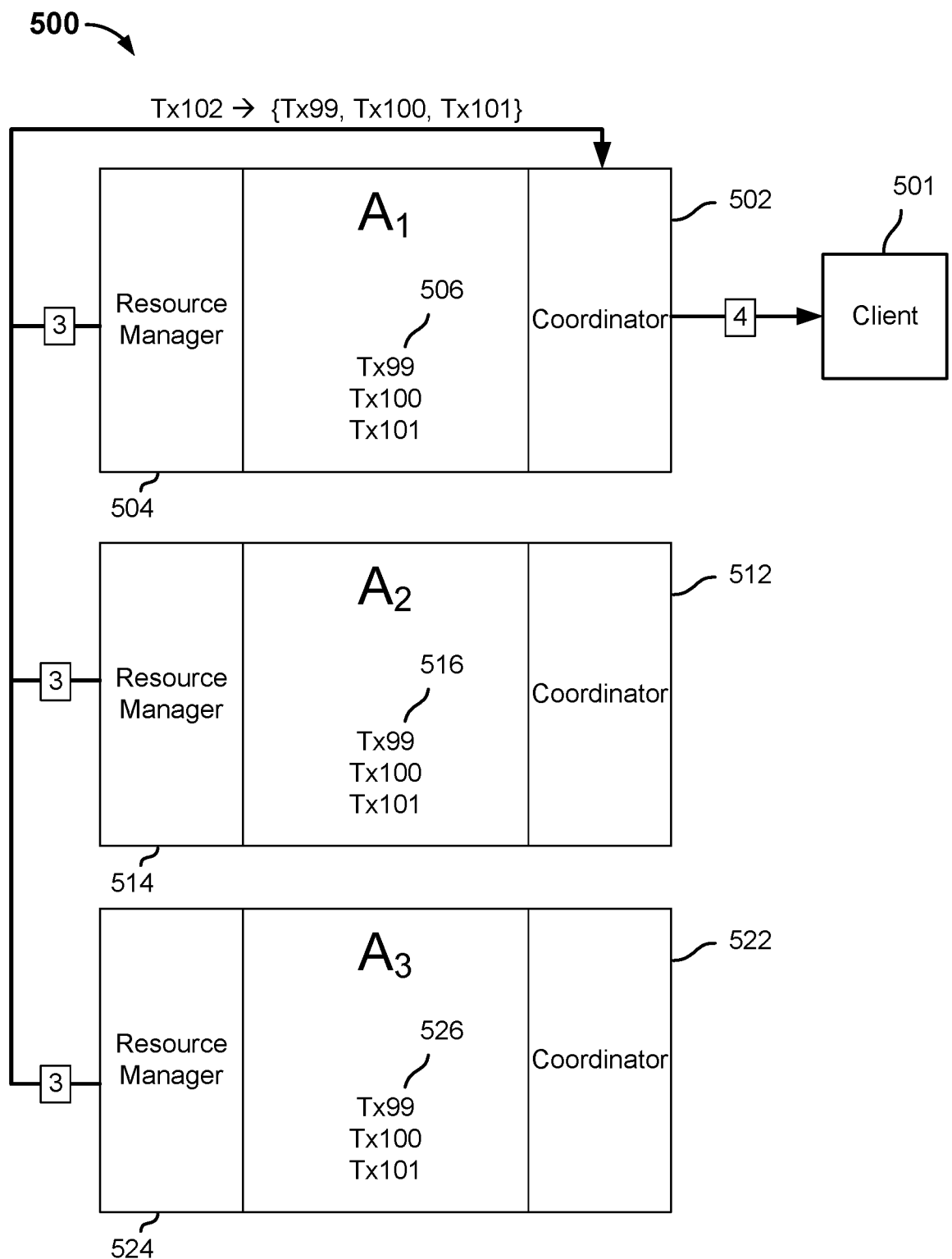

FIG. 5B shows that if constraints are upheld the respective Resource Managers (504, 514, 524) each sends a prepared message labelled "3", back to the Coordinator 502, along with the leading edge of its TxDAG (506, 516, 526). From the Resource Manager's point of view the transaction is prepared awaiting confirmation from the Coordinator. The Coordinator 502 can transmit the outcome of the transaction to the client 501, labelled "4", at this point in this example, as it is guaranteed to commit (within the redundancy limits of the system).

Figure 5C:
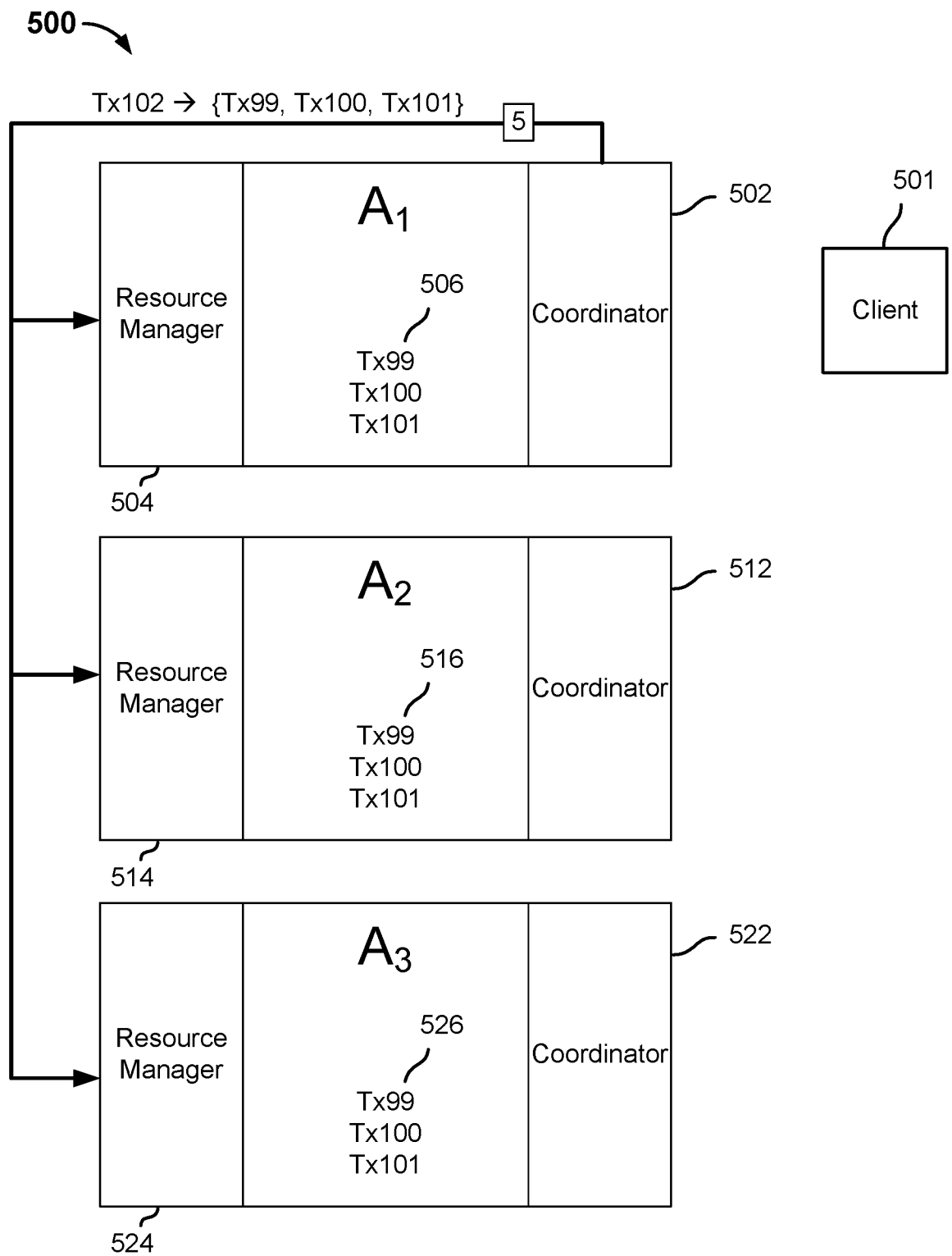

In the example shown in FIGS. 5A and 5B, there is a majority of Resource Managers which agrees on the outcome based on the same TxDAG state (leading edge), and so the Coordinator 504 for the transaction informs the participating Resource Managers (504, 514, 524) to commit, via a "commit" message that identifies the transaction ("Tx102" in this example) and data representing the TxDAG state (leading edge) on which the transaction is based ({Tx99, Tx100, Tx101} in this example). This is shown in FIG. 5C with commit messages labelled "5".

In various embodiments, if constraint violations or other failures occur, the Resource Manager sends an abort message back to the Coordinator with its TxDAG. This can occur where, even if the TxDAG precondition holds, some other failure (e.g. disk crash) has prevented the Resource Manager from preparing the transaction.

Figure 5D:
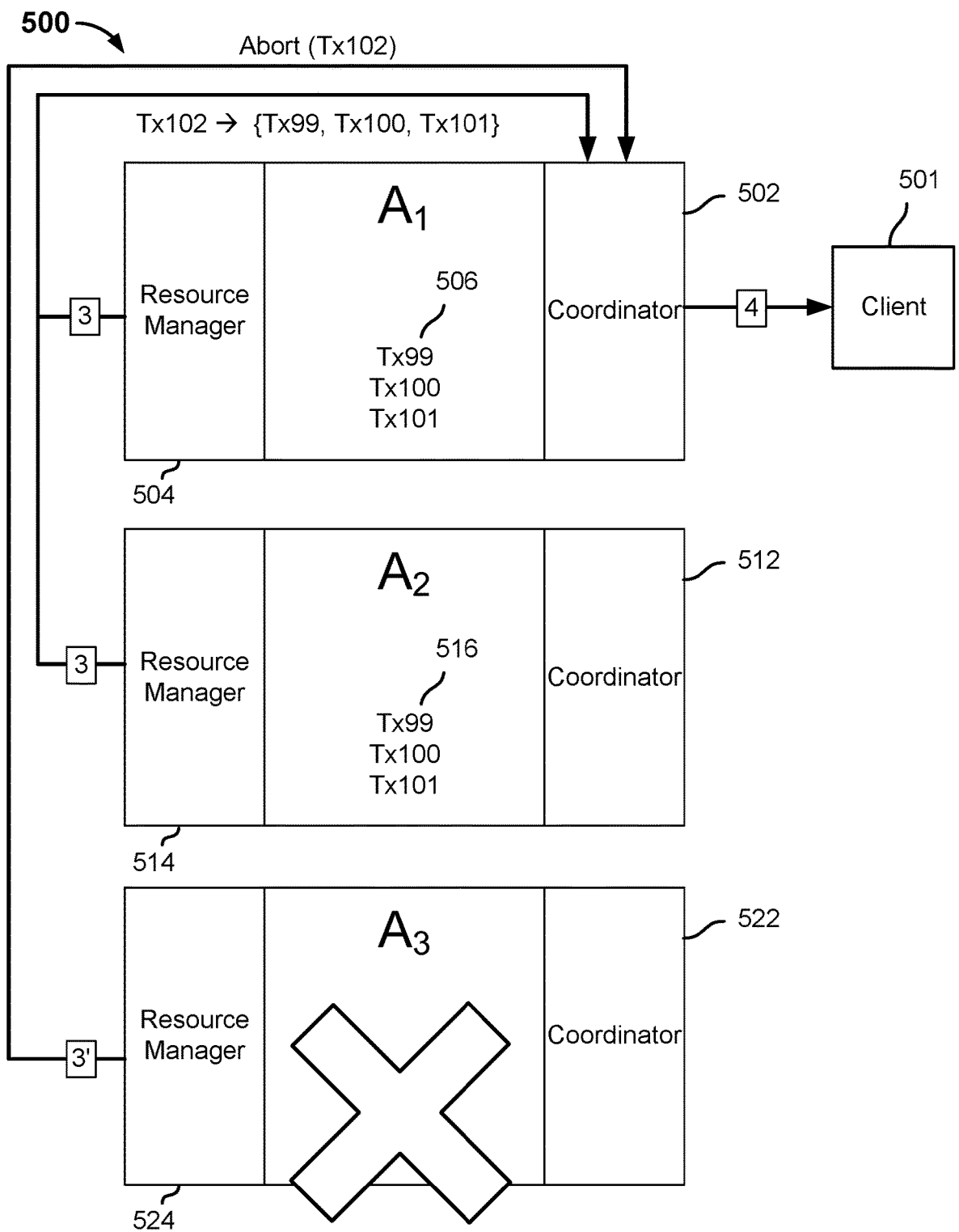

In the example shown in FIG. 5D, for example, the Resource Manager 524 of the server A3 votes to abort the transaction, e.g., due to resource contention (e.g., transaction requires lock on a resource already locked by/for another transaction) or other reason (e.g. failure). However, since a majority of Resource Managers (504, 514) responded that they were "prepared" to commit the transaction, as in the example above the Coordinator 502 for the transaction transmits the outcome of the transaction to the client 501, labelled "4", and informs all the participating Resource Managers (including those that voted to abort) to commit, as shown in FIG. 5C with commit messages labelled 5.

Figure 6A:
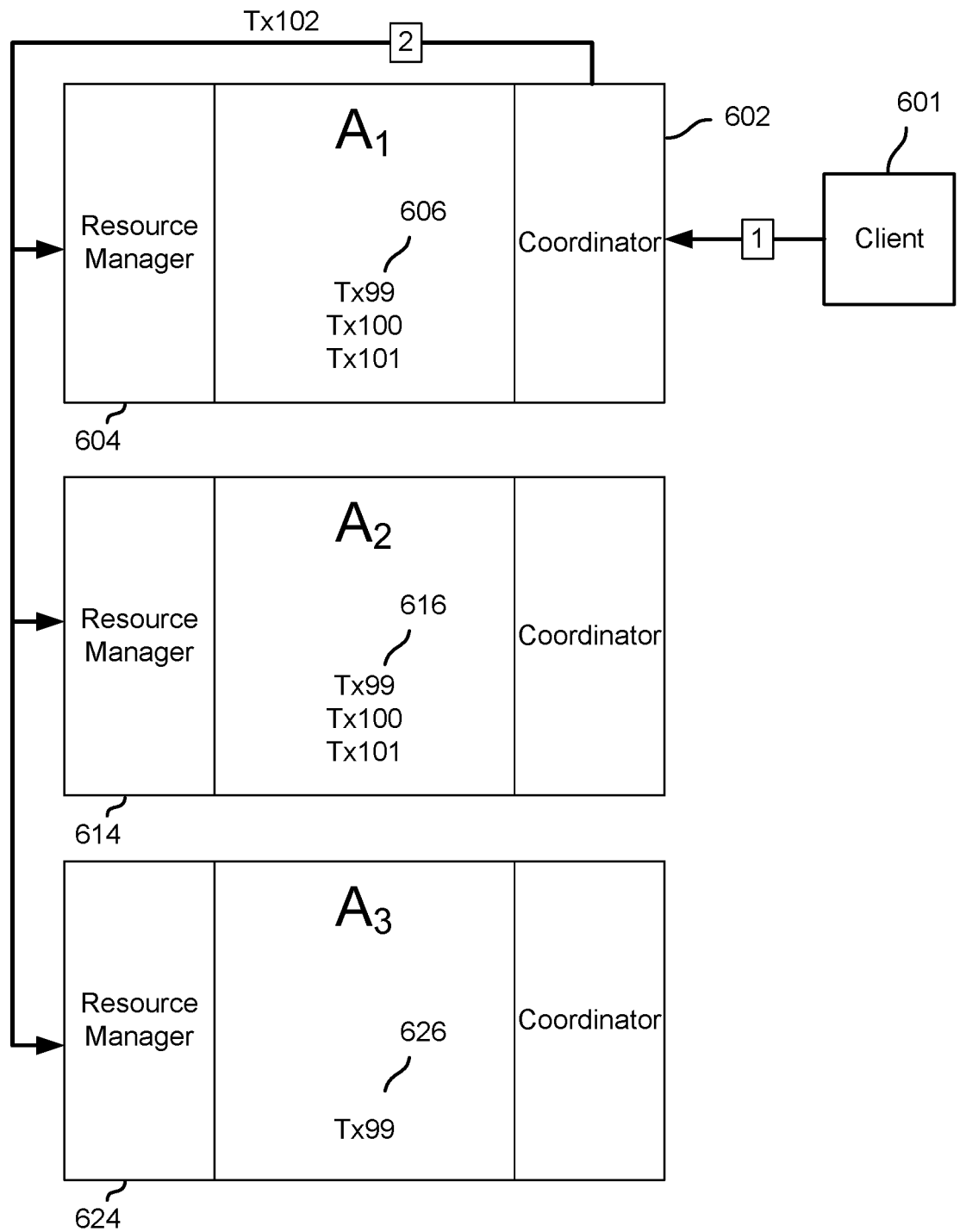
FIGS. 6A through 6C illustrate an example of transaction processing in a replicated database, according to techniques and using data structures, such as the TxDAG, as disclosed herein.
Figure 6B:
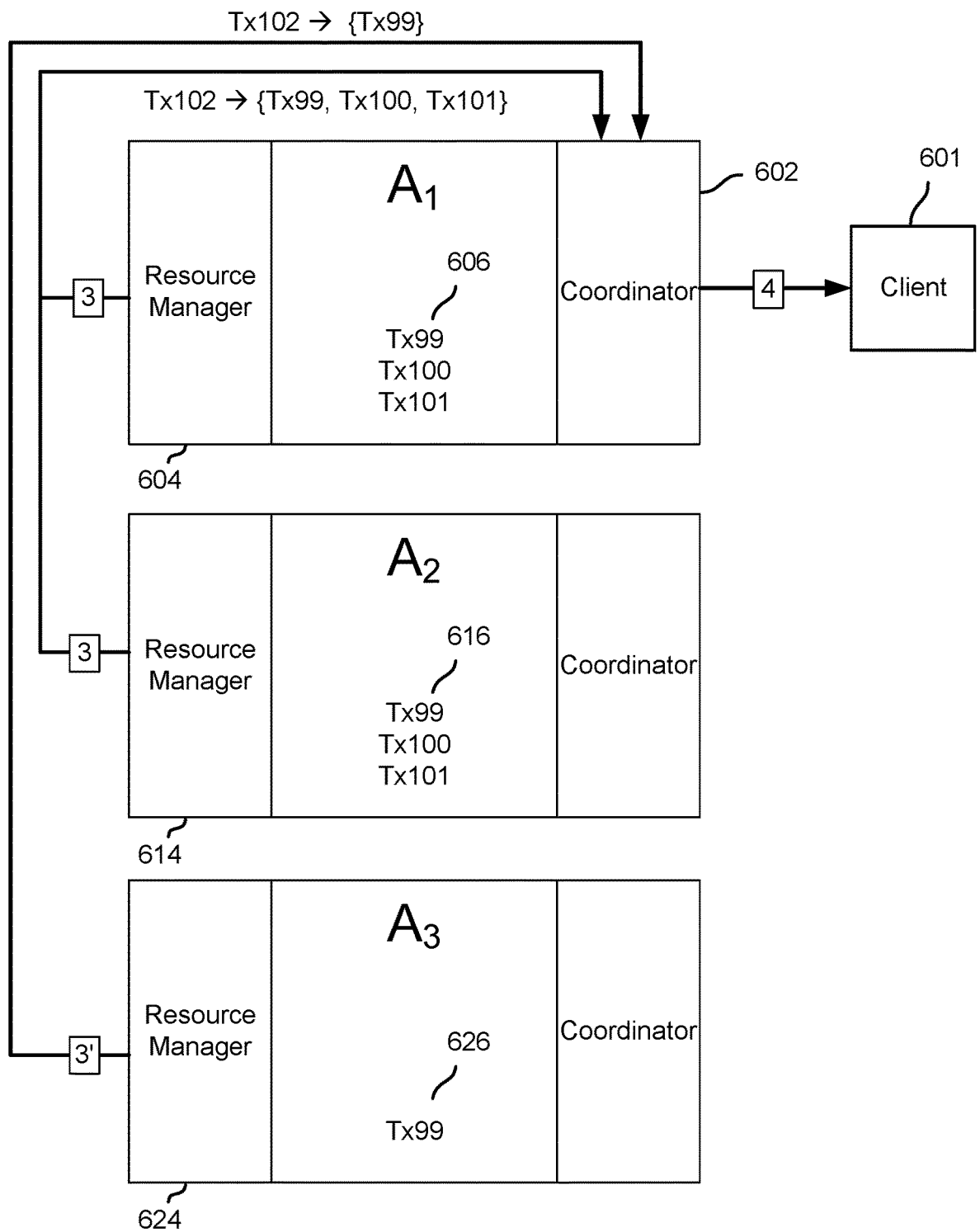
Figure 6C:
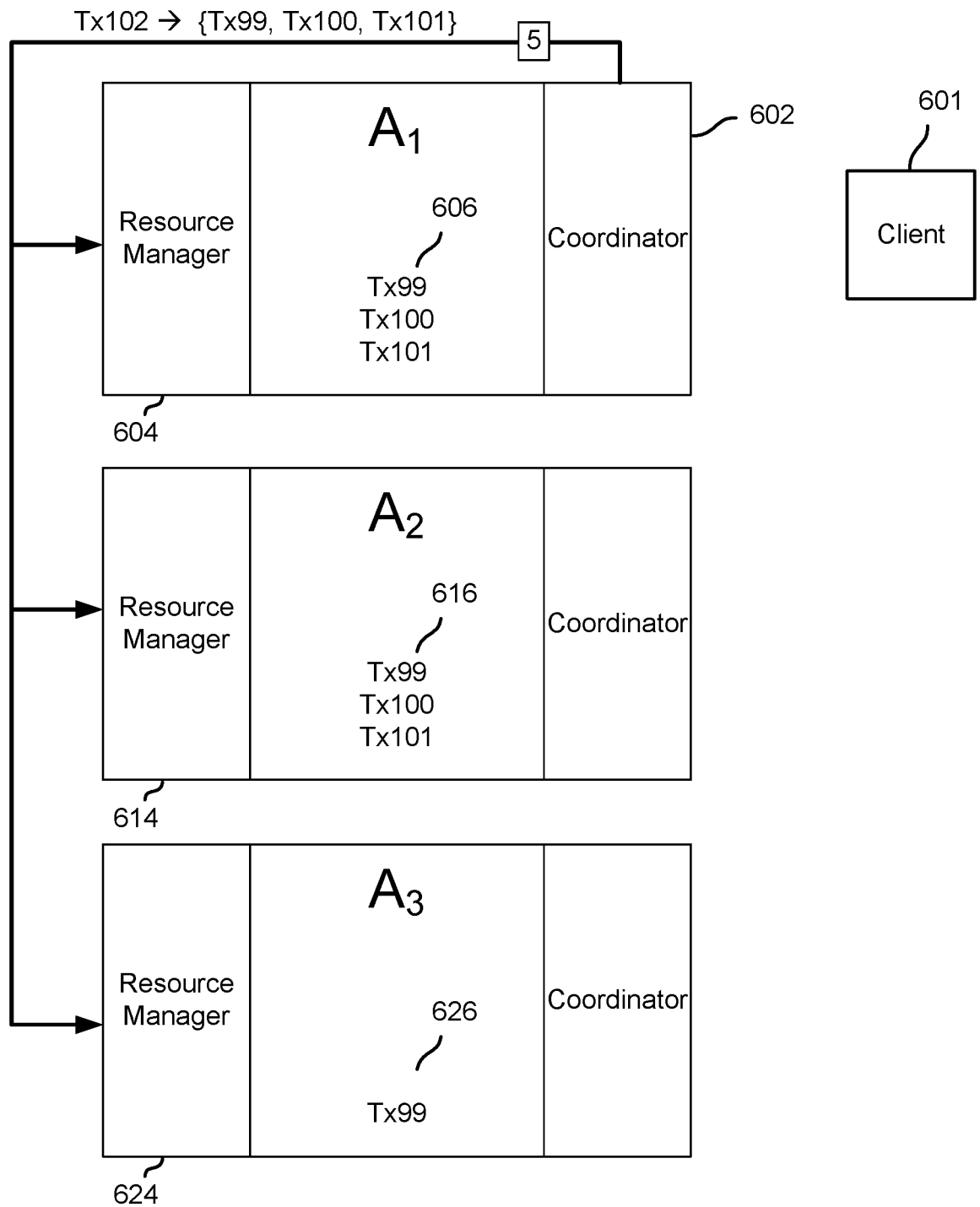

FIGS. 6A through 6C illustrate an example of transaction processing in a replicated database, according to techniques and using data structures, such as the TxDAG, as disclosed herein.

In the example shown in FIGS. 6A and 6B, all Resource Managers (604, 614, 624) vote to commit but there is a majority/minority split over the TxDAG leading edge (606, 616 differ from 626). Servers A1 and A2 declare the TxDAG (606, 616) leading edge upon which Tx102 is based is {Tx99, Tx100, Tx101} labelled "3". Server A3 declares the TxDAG (626) leading edge upon which Tx102 is based is {Tx99} labelled 3'. Informally server A3 lags the other servers and will either subsequently catchup under normal operations (e.g., it is about to commit transactions Tx100 and Tx101) or will shortly be prompted to catchup by receiving a commit message for Tx102 from the Coordinator 602. In this example, the transaction is "prepared" based on the majority's "prepared" response, and so the Coordinator 602 transmits the successful outcome to the client 601, labelled "4".

The Coordinator 601 correlates the votes and TxDAG leading edge from each Resource Manager (604, 614, 624. If it finds a majority of votes to prepare where each has the same TxDAG leading edge, then the transaction can commit, as shown in FIG. 6C. Otherwise it must abort. Either way, once a consistent majority of responses to the "prepare" message have been received by the Coordinator 601, it can transmit the outcome of the transaction back to the client 601, labelled "4", as shown in FIG. 6B.

In response to receiving the commit message from the Coordinator, each Resource Manager that voted to prepare will complete the transaction. The leading edge of the TxDAG is updated to reflect the newly applied transaction.

For any Resource Managers in a minority, e.g., server A3 in FIG. 6C, they interpret the commit message as a trigger to initiate repair. In the case where there is no permanent hardware failure so that a database merely lags the majority, receiving a commit message in response to sending an abort may trigger a catchup phase (assuming the transactions in the TxDAG have not been processed in the meantime). In various embodiments, in catchup the TxDAG of a peer server is applied to the lagging server. The TxDAG leading edge received acts as a causal barrier during catchup so that the lagging server chooses a server to catchup from which has processed at least those transactions which prevents catchup from other lagging servers. In the example shown in FIG. 6C, for example, server A3 would choose either A1 or A2 to catch up, because each has a TxDAG leading edge (606, 616) that matches the leading edge included by Coordinator 602 in the "commit" message (labeled "5") that prompted the server A3 to catch up, i.e., {Tx99, Tx100, Tx101}.

Once each Resource Manager has fully processed the commit message from the Coordinator, as in FIG. 6C, it sends a committed message back to the Coordinator. On receiving a committed message from a majority of the servers, the Coordinator can perform any housekeeping of its internal data structures relating to the current transaction.

In various embodiments, the fastest responding majority of Resource Managers may include those closest live servers to the originating Coordinator. However, in various embodiments it is possible for any majority of Resource Managers to conclude the commit process, even those whose servers many have had to first catch up before responding. As such, the approach disclosed herein is tolerant of unpredictable latencies, which are common in globally-distributed computer systems.

In the examples described above, the TxDAG has been identical on the majority of servers. However, it is also possible in a normally functioning system for any given server to be ahead or behind the others with respect to the transactions it has processed. As such, the TxDAGs on each server might be different but compatible. Such differences arise typically due to delays in message transmission or processing.

Figure 7A:
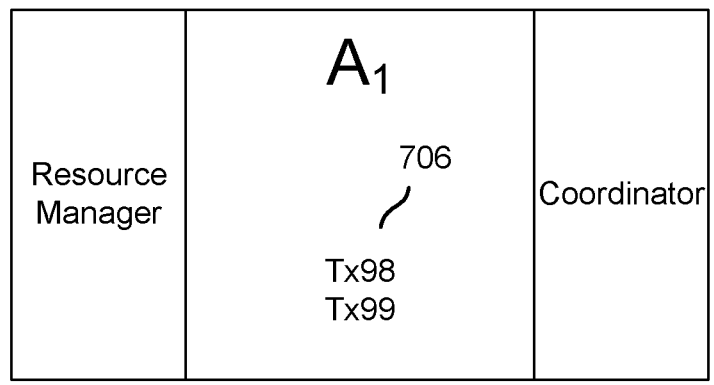
FIG. 7A illustrates an example of a database replicated across three servers, each of which has a TxDAG (706, 716, 726) in a state that is different from but also compatible with the respective TxDAGs of the other servers.
Figure 7A:
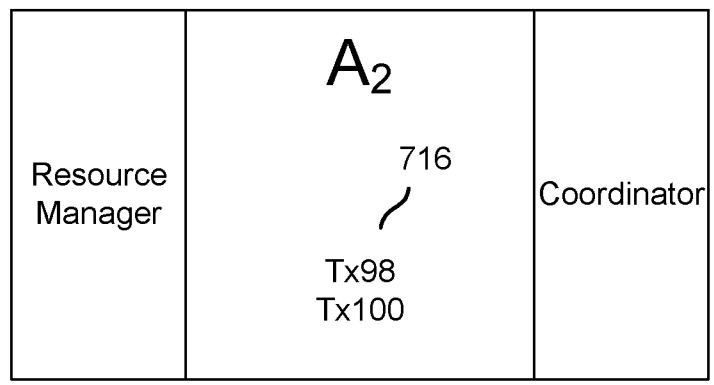
Figure 7A:
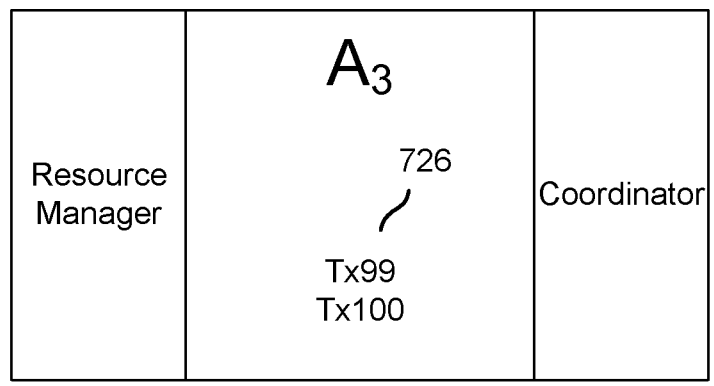

FIG. 7A illustrates an example of a database replicated across three servers, each of which has a TxDAG (706, 716, 726) in a state that is different from but also compatible with the respective TxDAGs of the other servers. In the example shown, a three server replicated database where transactions have been processed at different rates by different servers, but where each transaction (98, 99, 100) have been successfully committed by a majority, is shown.

Figure 7B:
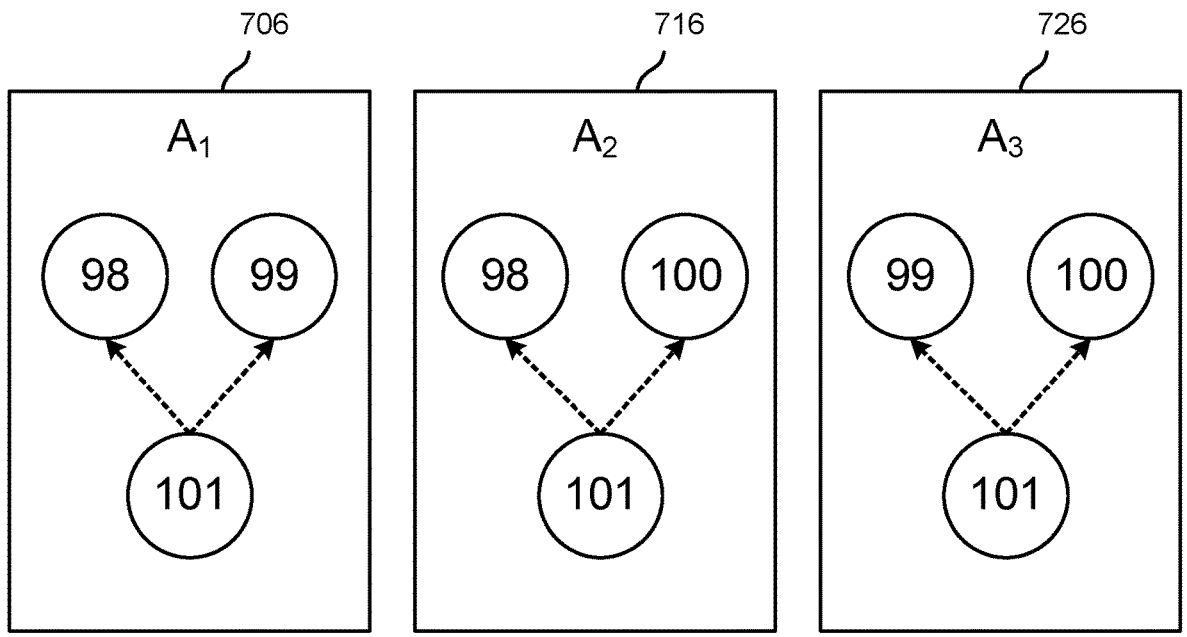
FIG. 7B shows a (partial) TxDAG for each of the servers in FIG. 7A.

FIG. 7B shows a (partial) TxDAG for each of the servers in FIG. 7A. It is straightforward to reason that there are no existing conflicts in their TxDAGs, e.g. where one server has different and incompatible ancestor transactions to the others, because by induction if a transaction is committed (by a majority) then its ancestors must also have been committed (by a majority).

In the example shown in FIG. 7B, Tx101 depends on A1 {98,99}, A2 {98,100}, and A3 {98, 99,100}. Since 98, 99, and 100 are all committed in a majority of servers, they will be committed at all servers. As such it is safe to take the union of those transactions as the leading edge of the TxDAG because of the inductive safety property.

When the Coordinator issues prepare messages for a new transaction, say Tx101, it will receive different views of the TxDAG leading edge from each server. Specifically, it will receive A1 {98,99}, A2 {98,100}, and A3 {99,100}. From this the Coordinator can deduce that its precondition is a leading edge comprising the three leaf nodes of committed transactions (98, 99, 100) and it uses this leading edge {98, 99, 100} as its precondition for processing Tx101.

When Tx101 →{98, 99, 100} is received at each of A1, A2, and A3 different processing occurs. At A1, processing of Tx101 is delayed until Tx100 (which must be in progress because it has committed on a majority) has been processed. At A2 the processing of Tx101 is delayed until Tx99 has been processed (which again must be in progress because it has committed on a majority). At A3, Tx101 is delayed until Tx98 has been processed (which again must be in progress because it has committed on a majority). Had any servers by chance held the full TxDAG leading edge, {98, 99, 100}, by the time they received the "commit" message indicating that leading edge, then they would be able to process Tx101 immediately.

Note that while identical TxDAGs are present in examples included in this disclosure, those skilled in the art will recognize that is a stricter condition than necessary and the union of committed leaf nodes in the TxDAG is sufficiently safe and permits greater levels of concurrent processing. In various embodiments, the leading edge includes all the transactions that no other transactions depend on.

As shown above, techniques disclosed herein can readily support single server and replicated database use cases. In both cases, a Coordinator asks the Resource Managers to prepare a transaction, and each Resource Manager makes a localized decision whether or not the transaction can be actioned based on local state, including the transactions that have previously been applied and those currently in flight. On determining that a transaction can be actioned, the Resource Manager sends a confirmatory message to the originating Coordinator along with the leading edge of the local TxDAG. If the Coordinator finds a majority agreement in vote and TxDAG leading edge for a transaction, then it will tell the Resource Managers to make the work permanent; otherwise it will abort.

In various embodiments, techniques disclosed herein are generalized a step further to address the case of a distributed (graph or other) database management system. In such a system the database is split across multiple cooperating servers such that no single server hosts a complete set of the data. The intention of such a design is to improve throughput by allowing physically concurrent activity on multiple servers for both reads and writes.

Figure 8:
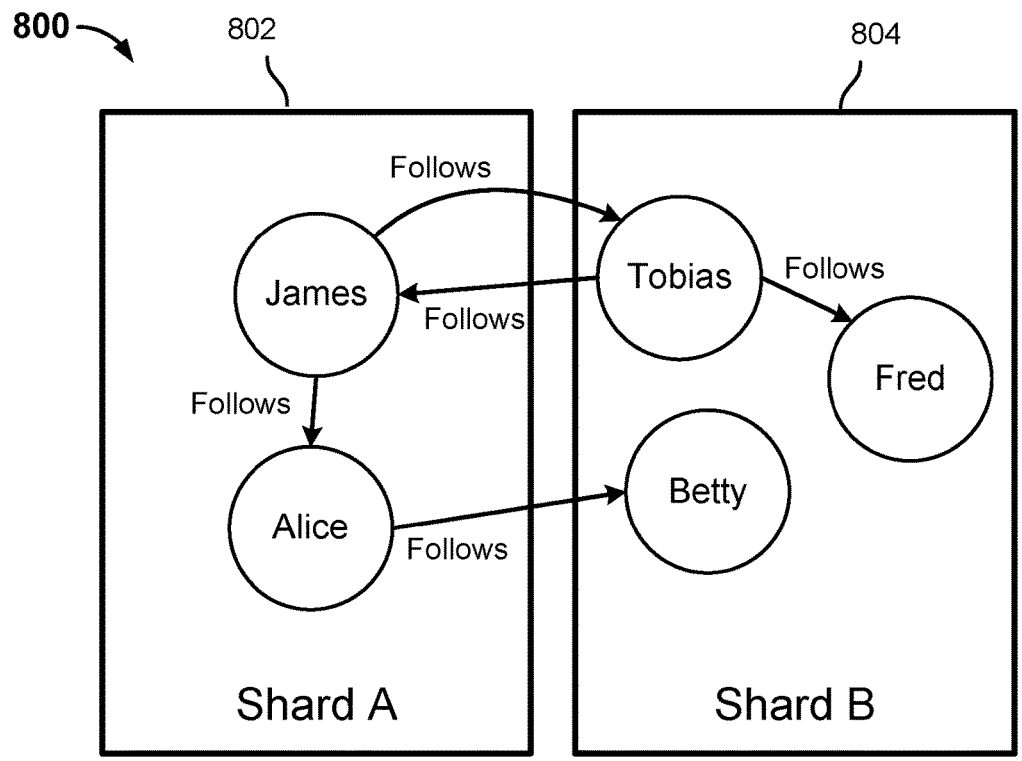
FIG. 8 illustrates an example of a distributed graph database.

FIG. 8 illustrates an example of a distributed graph database. Distributed graph databases have well-known dependability challenges. In particular, when relationships between nodes in a graph span across shards with eventual consistency semantics they can easily be corrupted, even in the absence of faults. In various embodiments, techniques disclosed herein are used to provide reciprocal consistency for distributed graphs to prevent such a possibility.

Hosting graphs in the manner shown in FIG. 8 is normal for distributed graph databases. In the example shown, distributed graph database 800 includes a shard "A" in server 802 and shard "B" in server 804. Some relationships between nodes reside entirely within a shard (termed local), e.g. James follows Alice. Some relationships cross shards (termed remote), e.g. Tobias follows James. Good partitioning algorithms ensure a minimal number of such remote relationships exist, but still typically around 30% of relationships are remote.

The physical records which store the graph shown in FIG. 8 must be in reciprocal agreement on both shards (802, 804). That is, there is a record on Shard A which stores an outbound relationship labelled follows from the node labelled Alice to the remote node labelled Betty. Meanwhile there is also a corresponding record on Shard B which stores an inbound relationship from the remote node labelled Alice to a node labelled Betty. The logical record created by two physical records allows a query to infer that Alice follows Betty and that Betty is followed by Alice just as if the records we simple records in a single database. Moreover the reciprocity allows the relationship to be traversed in either direction at the same cost which is an important consideration in the design of a graph database management system.

To prevent corruption, the reciprocity of the two physical halves of the logical single record must be maintained. Any window of inconsistency between the physical records because of delays in message processing or mutually out of order transaction application will allow dirty reads or inconsistent writes, both of which lead to corruption. In various embodiments, a distributed graph database system as disclosed herein rules out this possibility and keeps the data consistent always.

In the distributed case, a client binds to a Coordinator to initiate a transaction. Any Coordinator can be used, though for performance reasons a Coordinator under low load from an active shard for the transaction would typically be selected.

The Coordinator begins the commit process using the same protocol as the replicated database examples in FIGS. 5A through 6C but on every server on every participating shard (a replicated database can be seen as a single shard in this model). Each live server responds to the Coordinator with its decision to commit or abort along with its TxDAG.

The Coordinator processes the response messages from each server. It determines whether for each shard there is a majority agreement for vote and TxDAG. If every shard can provide a majority agreement (a Conjunction of Majorities) will the Coordinator instruct all members to commit the transaction.

Figure 9:
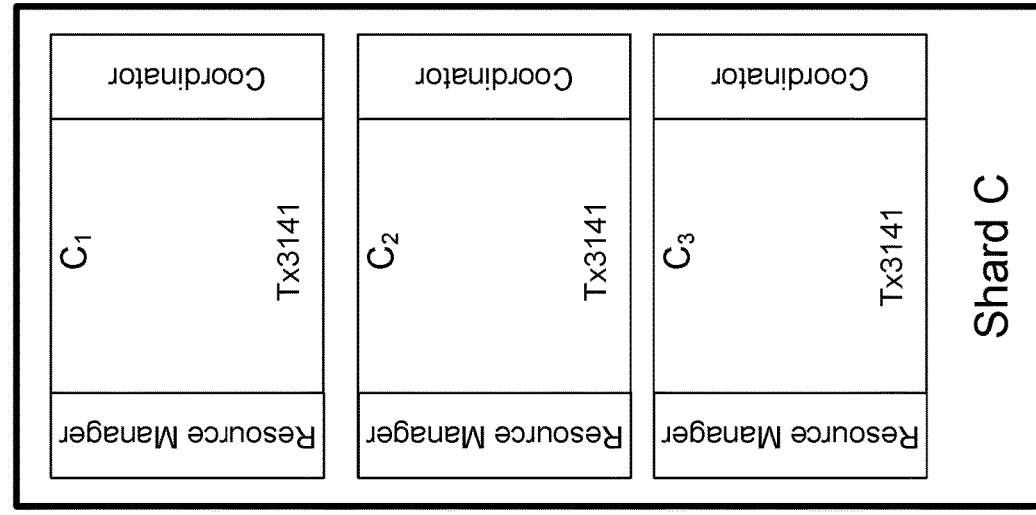
FIG. 9 illustrates an embodiment of a partitioned (distributed) graph database system 900.
Figure 9:
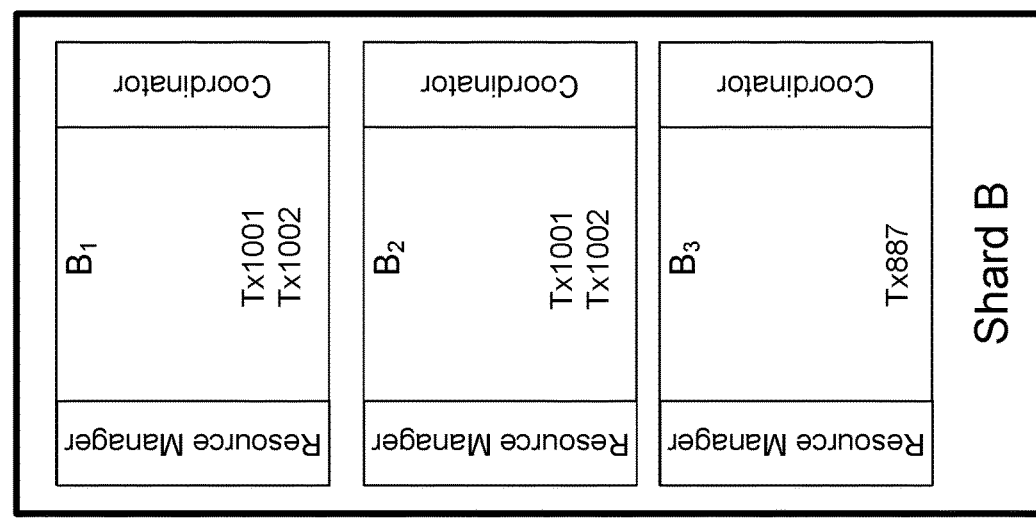
Figure 9:
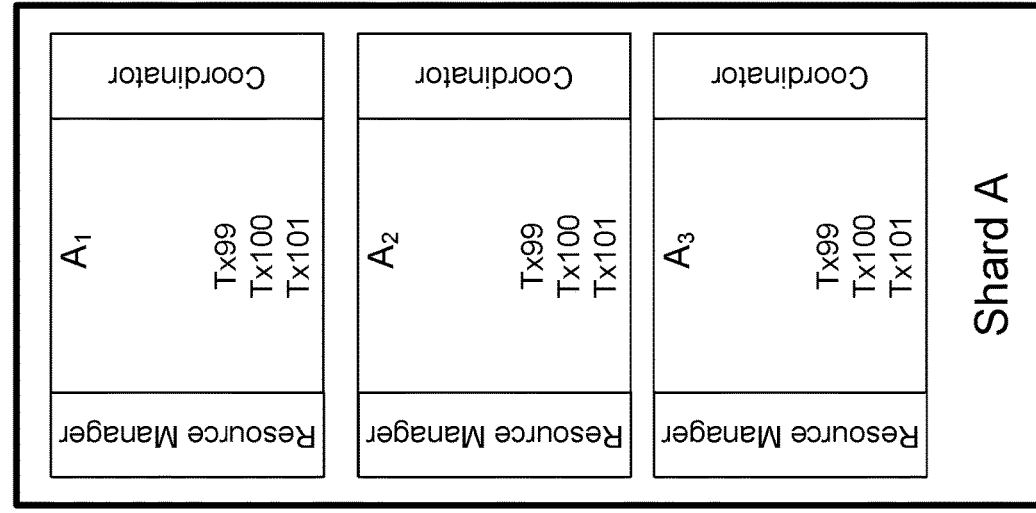

FIG. 9 illustrates an embodiment of a partitioned (distributed) graph database system 900. In the example shown, within each shard (902, 904, 906) the servers (e.g., A1, A2, and A3, for Shard A (902)) are redundant for fault tolerance. Each replica server within a shard is a copy of the others (of course allowing for lag while data is replicated over the network) which is a subset of the overall data stored by the system 900 as a whole.

In the example shown in FIG. 9, a Conjunction of Majorities is possible. All servers in Shard A (902) happen to be consistent with each other so assuming no faults they would vote to commit the transaction based on {Tx99, Tx100, Tx101}.

In Shard B, server B3 is lagging and votes to commit based on {Tx887}. However, a ⅔ majority is formed in Shard B by Servers B1 and B2 which both vote to commit based on {Tx1001, 1002}.

In Shard C all servers happen to be consistent with each other so assuming no faults they would vote to commit the transaction based on {Tx3141}.

On receiving these responses, the Coordinator computes that a valid Conjunction of Majorities exists and instructs all participating servers to commit, transmitting the appropriate TxDAG for each server's shard.

If all shards involved in the transaction cannot provide a consistent commit result, then the transaction is aborted across all servers in all shards. The result is logically that the update never took place.

A number of examples described so far have focused on the safety of a single transaction in a single server, replicated servers, and distributed (sharded) system. In various embodiments, the same safety guarantees are provided for concurrent transactions.

Figure 10A:
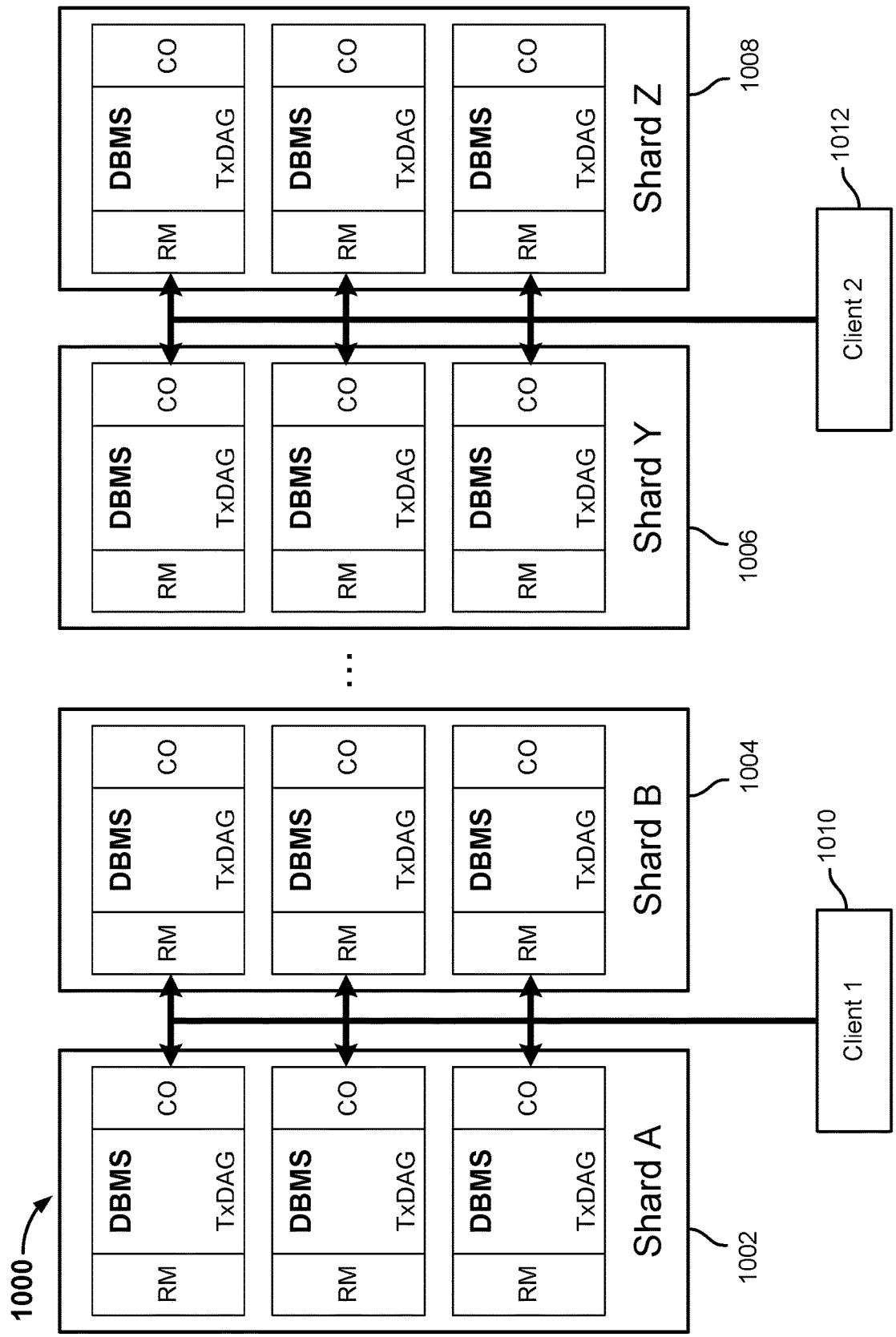
FIG. 10A illustrates a case of concurrent transactions across disjoint shards.

FIG. 10A illustrates a case of concurrent transactions across disjoint shards. In the example shown, Client1 1010 executes a transaction across shards A (1002) and B (1004) of distributed (graph) database system 1000, while Client2 (1012) executes a transaction across shards Y (1006) and Z (1008). Safety for the concurrent transactions is simple to reason about: because they operate on completely disjoint data, there is no contention and therefore each proceeds unaware of the other's execution. This is a beneficial property of a system as disclosed herein, namely that transactions operating on disjoint data do not need further coordination. This property provides good scalability.

Figure 10B:
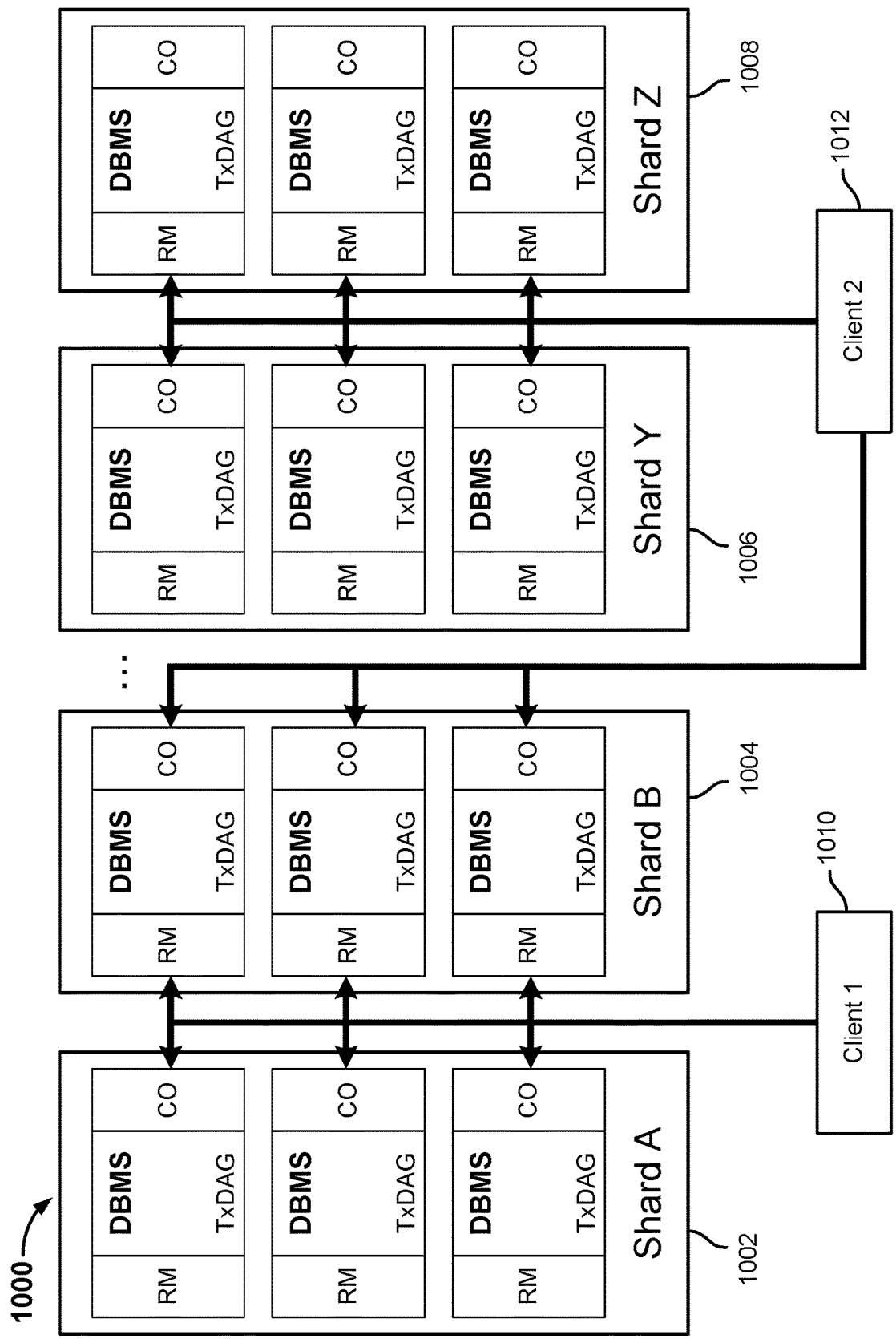
FIG. 10B illustrates a case where concurrent transactions contend for access to data in a shard.

FIG. 10B illustrates a case where concurrent transactions contend for access to data in a shard. In the example shown, Client1 (1010) executes a transaction across shards A (1002) and B (1004) while a transaction from Client2 (1012) executes across shards Y (1006) and Z (1008) and intersects Client1's transaction on shard B (1004).

If the transactions do not contend for data within shard B, then all is well. The transactions proceed much like the example shown in FIG. 10A, where no contention means the transactions are largely unaware of each other. However if the transactions do contend for data access then the servers in shard B will ultimately arbitrate which transaction has the opportunity to commit and which must abort.

Each server in shard B will have a view on whether to process the transaction from Client1 or Client2 first (for example by arrival order). A majority will, by definition, be formed and the TxDAG of that majority will change to reflect the majority decision. Whichever transaction has been chosen first by the majority will have the opportunity to commit, while the other will be aborted when it comes to be processed because the TxDAG will not be compatible with its own declaration. While such aborts are not desirable, they are safe and given a good sharding strategy are uncommon enough to provide good throughput for the database.

Figure 11:
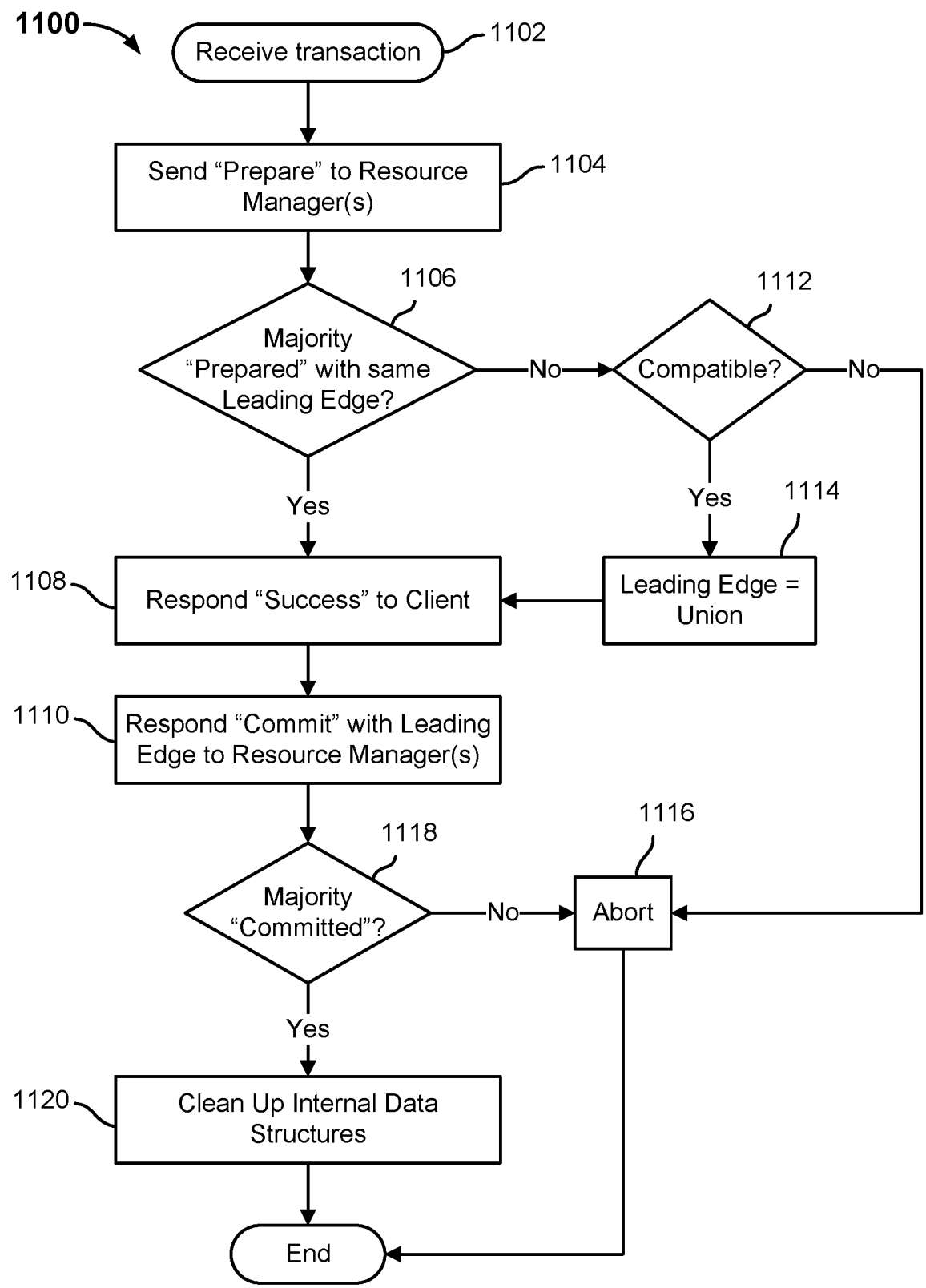
FIG. 11 is a flow chart illustrating an embodiment of a process to implement a transactional commit protocol based on safe conjunction of majorities.

FIG. 11 is a flow chart illustrating an embodiment of a process to implement a transactional commit protocol based on safe conjunction of majorities. In various embodiments, the process 1100 of FIG. 11 is performed by a Coordinator or similar component, module, and/or process comprising a database management server. In the example shown, upon receiving a transaction (1102), e.g., from a client, a "prepare" message is sent to one or more Resource Managers (1104) associated with the transaction. For example, the "prepare" message may be sent to the respective Resource Manager for each database management server associated with a replicated and/or distributed database storing data affected by the transaction. At 1106, it is determine whether matching /or compatible "prepared" messages have been received from a majority of participating Resource Managers. If so, at 1108 a "success" response is sent to the requesting client, and at 1110 a "commit" message including the majority leading edge is sent to the participating Resource Managers.

If at 1106 it is determined that a majority of Resource Managers have not responded with the same "prepared" message (e.g., a majority are "prepared" but no majority agrees as to the TxDAG leading edge, as in the example shown in FIGS. 7A and 7B), at 1112 it is determined whether a majority of the "prepared" responses reported TxDAG leading edges that while not identical are "compatible", as in the example shown in FIGS. 7A and 7B. If so, a TxDAG leading edge comprising a union of the compatible responses is constructed at 1114 and included in a "commit" message sent at 1110.

Once a "commit" message has been sent at 1110, it is determined at 1118 whether a majority of participating Resource Managers have returned a "committed" response. If so, at 1120 internal data structures of the Coordinator relating to the transaction are cleaned up and the process 1100 ends.

If at 1112 it is determined that a majority of the non-identical TxDAG leading edges are not "compatible", or if at 1118 a majority fails to return a "committed" response, at 1116 the transaction is aborted and a negative report is sent to the client, after which the process 1100 ends.

Figures 12A, 12B:
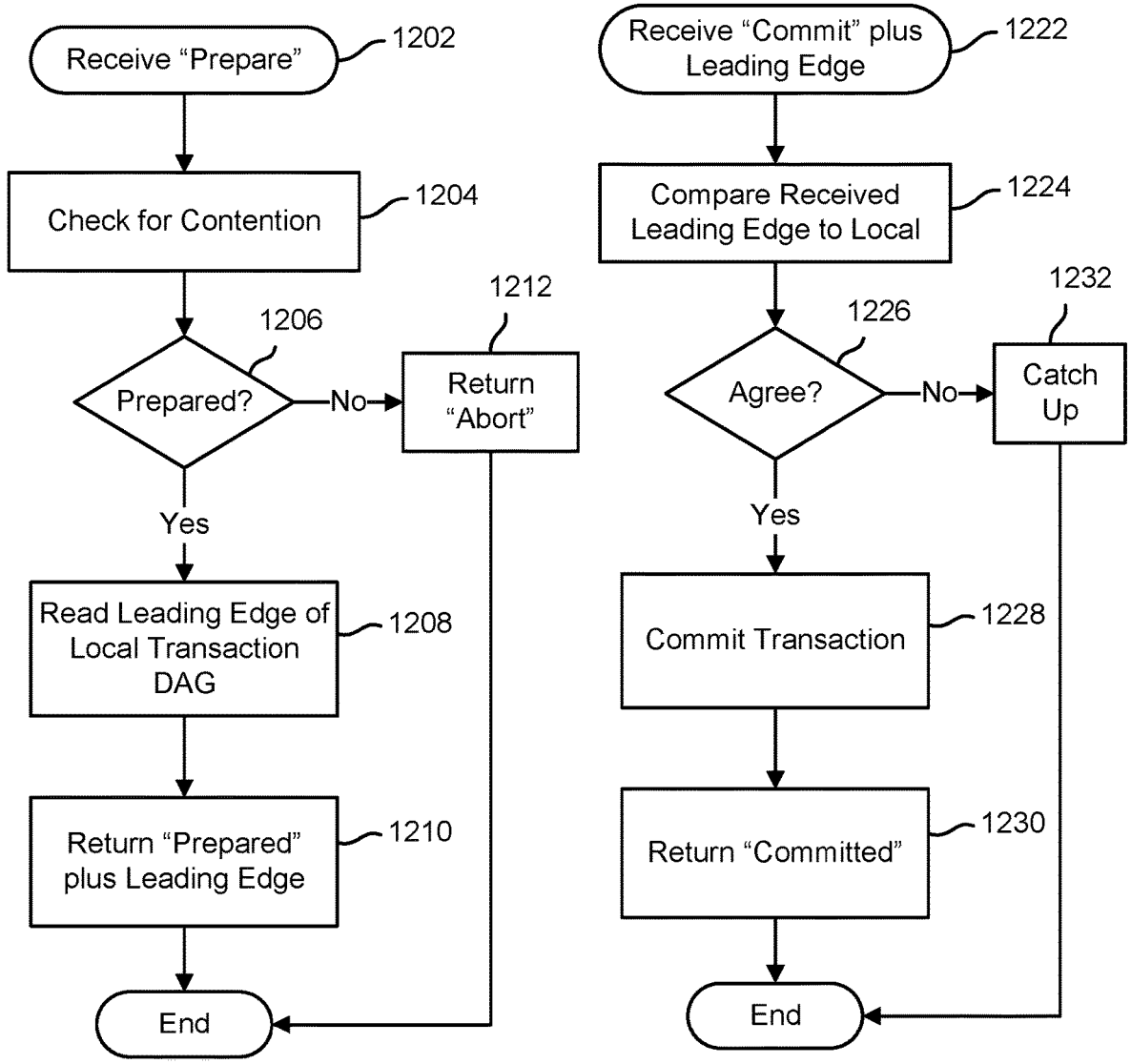
FIG. 12A is a flow chart illustrating an embodiment of a process to use a TxDAG to process database transaction-related requests.
FIG. 12B is a flow chart illustrating an embodiment of a process to use a TxDAG to process database transaction-related requests.

FIG. 12A is a flow chart illustrating an embodiment of a process to use a TxDAG to process database transaction-related requests. In various embodiments, the process of FIG. 12A is performed by a Resource Manager comprising a database management server as disclosed herein. In the example shown, upon receiving a "prepare" message at 1202, the Resource Manager checks at 1204 whether the received transaction contends with any other pending transaction for the same data. If not, at 1206 the Resource Manager concludes it is prepared to commit the transaction. At 1208, the Resource Manager determines the leading edge of its local TxDAG and at 1210 sends the Coordinator a "prepared" message that includes a data representing the leading edge, after which the process of FIG. 12A ends. If the contention check performed at 1204 indicates the transaction received at 1202 cannot be performed, at 1206 the Resource Manager concludes it is not prepared to commit the transaction received at 1202 and at 1212 returns an "abort" response to the Coordinator, after which the process of FIG. 12A ends.

FIG. 12B is a flow chart illustrating an embodiment of a process to use a TxDAG to process database transaction-related requests. In various embodiments, the process of FIG. 12B is performed by a Resource Manager comprising a database management server as disclosed herein. For example, the process of FIG. 12B may be performed in response to receiving a message to "commit" a transaction the Resource Manager previously indicated it was "prepared" to commit, as described above in connection with FIG. 12A.

In the example shown in FIG. 12B, at 1222 the Resource Manager receives a "commit" message that includes an associated TxDAG leading edge. At 1224, the received leading edge is compared to the leading edge of the local TxDAG. If the two agree (1226), the Resource Manger commits the transaction at 1228 and at 1230 returns a "committed" message to the Coordinator. If the leading edge received at 1222 with the transaction "commit" message does not match the local TxDAG (1226), a "catch up" process is initiated at 1232, and the process of FIG. 12B ends, in this example without (immediately) committing the transaction or sending a "committed" response to the Coordinator.

Techniques have been disclosed to safely and performantly store data in a database, including without limitation a replicated and/or distributed graph database. In various embodiments, techniques disclosed herein enable a relaxation of traditional transaction processing such that non-contending transactions can be run in parallel.

In various embodiments, the disclosed approach allows a database to simultaneously uphold ACID properties and a useful degree of scalability through concurrent processing of updates in the typical case. Moreover, a system as disclosed herein scales conveniently from a single server to a replicated cluster, and from a replicated cluster to a distributed graph database where data is partitioned into shards.

In various embodiments, a system as disclosed herein is general purpose, but is specifically useful for distributed graph databases since it solves the reciprocal consistency problem without inhibiting horizontal scale.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory or other storage device configured to store a directed acyclic graph comprising, for each of a plurality of transactions, data identifying the transaction, data indicating one or more prior transactions on which the transaction depends, and data indicating whether the transaction has been committed; and
a processor associated with a resource manager of a first database server included in a plurality of database servers each having a resource manager, the processor being coupled to the memory or other storage device and configured to:
determine a leading edge comprising a set of committed leaf nodes of the directed acyclic graph; and
provide data representing the leading edge to an external transaction coordinator;
wherein the transaction coordinator is configured to:
receive a respective leading edge from each respective resource manager of each of the plurality of database servers; and
allow a commit of a candidate transaction based at least in part on a determination that a majority of the resource managers have indicated they are prepared to commit the transaction and a majority have reported leading edges that are not identical but are compatible.

2. The system of claim 1, wherein the plurality of database servers are associated with a database replicated across the plurality of database servers.

3. The system of claim 1, wherein the plurality of database servers are associated with a database distributed across the plurality of database servers.

4. The system of claim 1, wherein the processor is further configured to receive a message to commit the transaction and a leading edge data associated with the commit message; and to commit the transaction based at least in part on a determination that the received leading edge data matches a local leading edge of a local directed acyclic graph.

5. The system of claim 1, wherein the processor is further configured to receive a message to commit the transaction and a leading edge data associated with the commit message; and to initiate a catch up procedure based at least in part on a determination that the received leading edge data does not match a local leading edge of a local directed acyclic graph.

6. The system of claim 5, wherein the catch up procedure includes using data from a peer system having a directed acyclic graph with a leading edge that matches the leading edge data associated with the commit message.

7. The system of claim 6, wherein the processor is further configured to send a committed message upon completing the catch up procedure successfully including by committing the transaction.

8. The system of claim 1, wherein a root node of the acyclic graph represents an empty database and other nodes of the acyclic graph represents transactions in the database, wherein the transactions in the database include updates to the database.

9. A system comprising:
a memory or other storage device configured to store a directed acyclic graph comprising, for each of a plurality of transactions, data identifying the transaction, data indicating one or more prior transactions on which the transaction depends, and data indicating whether the transaction has been committed; and
a processor associated with a transaction coordinator, the processor being coupled to the memory or other storage device and configured to:
  receive a respective leading edge from each respective resource manager of each of a plurality of database servers, the respective leading edge comprising a set of committed leaf nodes of the directed acyclic graph, wherein the plurality of database servers are associated with a database distributed across the plurality of database servers, the plurality of database servers being configured in a plurality of subgroups each storing an associated shard of the distributed database;
  receive from each database server participating in the transaction a response indicating whether the database server is prepared to commit the transaction and data representing a local leading edge of a local directed acyclic graph of the database server;
  determine with respect to each shard implicated by the transaction whether a majority of database servers have indicated they are prepared to commit the transaction and have reported a leading edge that is compatible with committing the transaction; and
  commit the transaction based at least in part on a determination, based on the shard-specific determinations, that all shards implicated by the transaction have a majority of participating database servers prepared to commit the transaction.

10. A method, comprising:
storing a directed acyclic graph comprising, for each of a plurality of transactions, data identifying the transaction, data indicating one or more prior transactions on which the transaction depends, and data indicating whether the transaction has been committed;
determining, by a resource manager of a first database server included in a plurality of database servers each having a resource manager, a leading edge comprising a set of committed leaf nodes of the directed acyclic graph; and
providing, by the resource manager, data representing the leading edge to an external transaction coordinator;
wherein the transaction coordinator is configured to:
  receive a respective leading edge from each respective resource manager of each of the plurality of database servers; and
  allow a commit of a candidate transaction based at least in part on a determination that a majority of the resource managers have indicated they are prepared to commit the transaction and a majority have reported leading edges that are not identical but are compatible.

11. The method of claim 10, wherein the plurality of database servers are associated with a database replicated across the plurality of database servers.

12. The method of claim 10, wherein the plurality of database servers are associated with a database distributed across the plurality of database servers.

13. A computer program product embodied in a non-transitory computer readable medium and comprising computer instructions for:
storing a directed acyclic graph comprising, for each of a plurality of transactions, data identifying the transaction, data indicating one or more prior transactions on which the transaction depends, and data indicating whether the transaction has been committed;
determining, by a resource manager of a first database server included in a plurality of database servers each having a resource manager, a leading edge comprising a set of committed leaf nodes of the directed acyclic graph; and
providing, by the resource manager, data representing the leading edge to an external transaction coordinator;
wherein the transaction coordinator is configured to:
  receive a respective leading edge from each respective resource manager of each of the plurality of database servers; and
allow a commit of a candidate transaction based at least in part on a determination that a majority of the resource managers have indicated they are prepared to commit the transaction and a majority have reported leading edges that are not identical but are compatible.

\* \* \* \* \*